(12) United States Patent  
Stephenson

(10) Patent No.: US 7,704,464 B2
(45) Date of Patent: Apr. 27, 2010

(54) HYDROCARBON PROCESSING DEVICES AND SYSTEMS FOR ENGINES AND COMBUSTION EQUIPMENT

(75) Inventor: Jeffrey A. Stephenson, Hope (CA)

(73) Assignee: 0783963 BC Ltd., Hope (CA)

( * ) Notice: Subject to any disclaimer, the term of this patent is extended or adjusted under 35 U.S.C. 154(b) by 345 days.

(21) Appl. No.: 11/575,476

(22) PCT Filed: Sep. 19, 2005

(86) PCT No.: PCT/US2005/033584

§ 371 (c)(1),
(2), (4) Date: Jun. 18, 2007

(87) PCT Pub. No.: WO2006/034243

PCT Pub. Date: Mar. 30, 2006

(65) Prior Publication Data

US 2007/0241033 A1 Oct. 18, 2007

Related U.S. Application Data

(60) Provisional application No. 60/610,775, filed on Sep. 17, 2004.

(51) Int. Cl.
*B01J 8/02* (2006.01)
*B01J 23/02* (2006.01)
*B01D 50/00* (2006.01)
*C01B 21/00* (2006.01)

(52) U.S. Cl. .............. 422/211; 422/171; 422/172; 422/177; 422/180; 422/181; 422/192; 422/222; 423/213.5; 210/171; 210/172.4; 210/323.1; 210/335; 210/338; 210/348; 210/435; 210/439; 210/446; 123/41.86; 502/300; 502/439; 502/527.12; 502/527.13; 502/527.19

(58) Field of Classification Search ............. 502/300, 502/439, 527.12, 527.13, 527.19; 423/213.5; 422/171, 172, 177, 180, 181, 192, 211, 222; 210/171, 172.4, 323.1, 335, 338, 348, 435, 210/439, 446; 123/41.86, 572
See application file for complete search history.

(56) References Cited

U.S. PATENT DOCUMENTS 3,460,612 A 8/1969 Valyi
4,853,360 A 8/1989 Hitachi (Continued)

OTHER PUBLICATIONS

International Search Report for PCT/US05/33584, International Searching Authority, Sep. 29, 2006, 3 pages.

*Primary Examiner*—Walter D Griffin
*Assistant Examiner*—Huy-Tram Nguyen
(74) *Attorney, Agent, or Firm*—Oyen Wiggs Green & Mutala LLP

(57) ABSTRACT

Hydrocarbon processing devices and systems are constructed to modify the combustion characteristics of hydrocarbon fuels and emissions for the purpose of emissions reduction and to increase the overall performance characteristics of the engine. According to one exemplary embodiment, a catalytic device for processing a fluid containing hydrocarbons includes a reactive body formed of a plurality of metallic materials arranged in a layered structure. The plurality of metallic materials is formed of at least two different materials. The body has an inner core member having a first density and another region, that is formed along a longitudinal length of the rolled layered structure, has a second density which is less than the first density.

58 Claims, 10 Drawing Sheets

U.S. PATENT DOCUMENTS

| | | |
|---|---|---|
| 4,857,500 A | 8/1989 | Hitachi et al. |
| 5,592,922 A * | 1/1997 | Denz .................... 123/520 |
| 5,645,803 A | 7/1997 | Steenackers et al. |
| 5,853,902 A | 12/1998 | Usui |
| 6,035,836 A * | 3/2000 | Watanabe ................ 123/572 |
| 6,040,064 A | 3/2000 | Bruck et al. |
| 6,109,386 A | 8/2000 | Maus et al. |
| 6,288,008 B1 | 9/2001 | Matsumoto |
| 6,460,525 B1 * | 10/2002 | Shureb .................... 123/572 |
| 6,689,328 B1 | 2/2004 | Otani et al. |
| 6,691,687 B1 * | 2/2004 | Liang et al. ............. 123/572 |
| 6,773,491 B1 * | 8/2004 | Bohl ........................ 96/130 |
| 2001/0027165 A1 | 10/2001 | Galligan et al. |
| 2002/0139745 A1 * | 10/2002 | Koguchi .................. 210/491 |
| 2003/0010692 A1 * | 1/2003 | Sato et al. ............... 210/172 |
| 2003/0165414 A1 | 9/2003 | Galligan et al. |
| 2004/0195230 A1 * | 10/2004 | Suenaga et al. ......... 219/390 |
| 2005/0061723 A1 * | 3/2005 | Matsushita .............. 210/171 |

\* cited by examiner

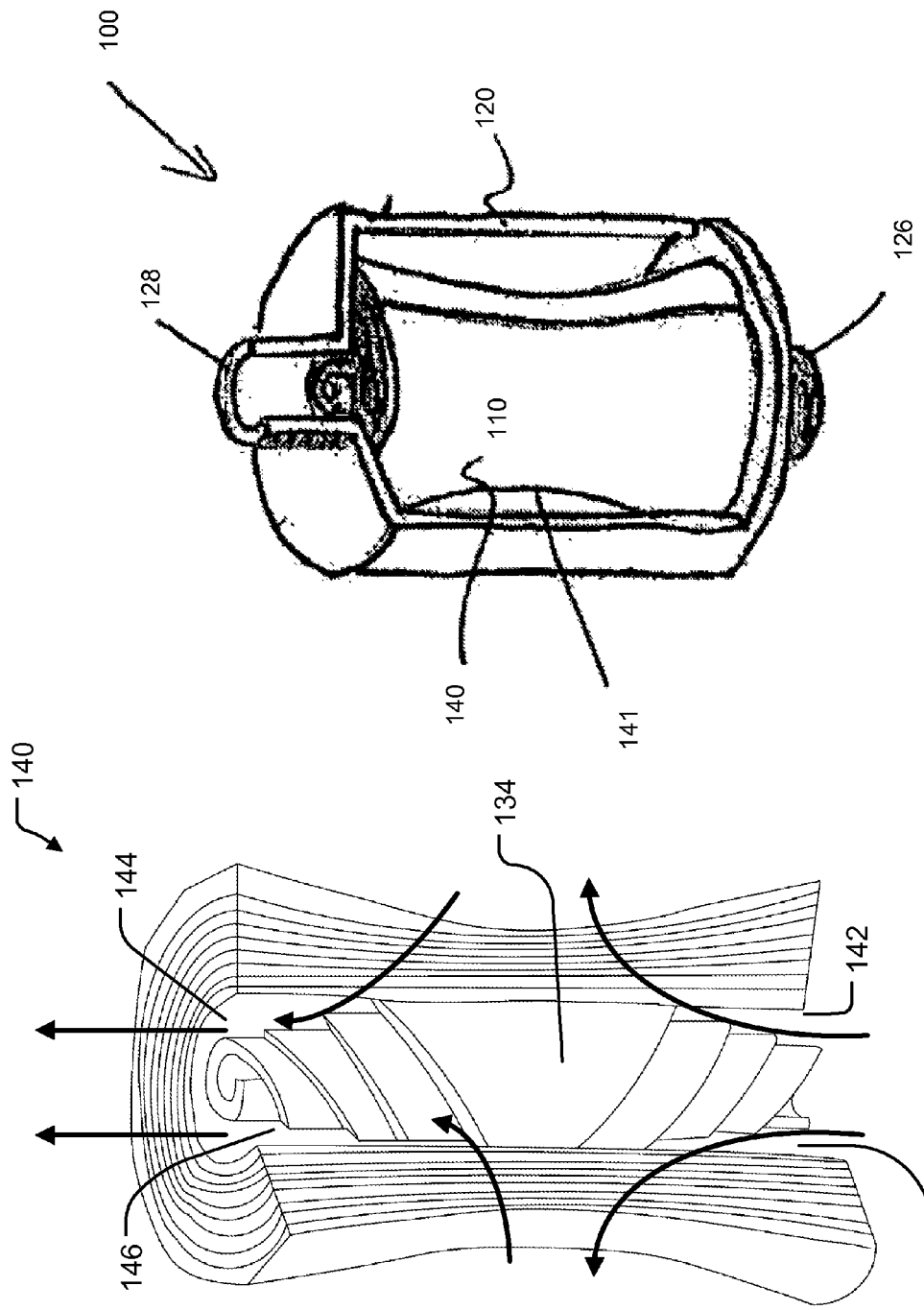

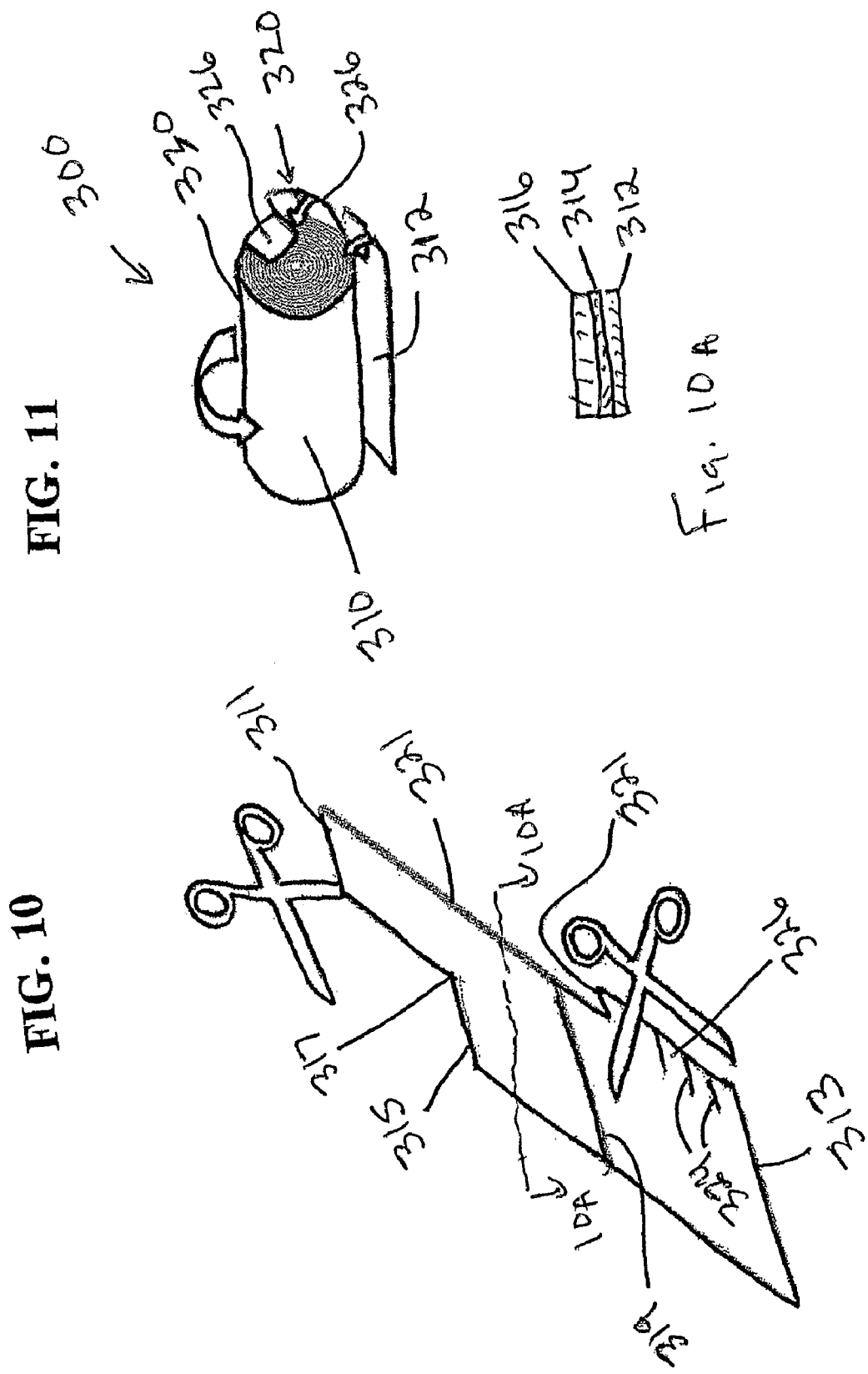

HYDROCARBON PROCESSING DEVICES AND SYSTEMS FOR ENGINES AND COMBUSTION EQUIPMENT

CROSS-REFERENCE TO RELATED APPLICATIONS

This application claims priority to U.S. Provisional Application Ser. No. 60/610,775 filed on Sep. 17, 2004 which is hereby incorporated by reference.

TECHNICAL FIELD

The present invention relates to hydrocarbon processing devices and systems and, more particularly, to catalytic devices and systems that are constructed to modify the combustion characteristics of hydrocarbon fuels and emissions for the purpose of emissions reduction and to increase the overall performance characteristics of the engine.

DESCRIPTION OF RELATED ART

Toxic exhaust emissions, such as carbon monoxide, unburned fuel, unburned carbon, soot, and oil vapor are usually present in the exhaust gases emitted from internal combustion engines. These toxic compounds are commonly a result of incomplete combustion which may be caused by a fuel quality being incompatible with the required combustion process, incomplete mixing of the fuel and air, or insufficient heat to provide fuel decomposition, etc. Most fuels contain a wide variety of dissimilar hydrocarbon compounds with corresponding variable rates of vaporization, decomposition, and combustion reaction intensities. Some fuels vaporize quickly, decompose easily and burn smoothly, while others vaporize very slowly, decompose incompletely to form unstable compounds that burn very fast and even detonate. Still others simply polymerize into clusters, absorb heat energy and simply escape out the exhaust as pollution.

Ideally then, for an internal combustion engine, or combustion equipment, to function at its optimum potential with minimum toxic emissions and greatest possible efficiency with lower maintenance, vibration and operating temperatures, the fuel must be able to vaporize and decompose easily and to propagate combustion reactions with controlled, stable velocities with an absolute minimum of shock waves.

Fuels, such as aviation fuel, gasoline, diesel fuel, propane and natural gas are all made up of the same building blocks, hydrogen and carbon. The difference between natural gas and diesel, for example, is simply how many carbon and hydrogen atoms are attached to each other in each molecule of fuel. The molecules of natural gas, for example, are very small and light since they contain only one carbon and four hydrogen atoms. This means that each molecular cluster of natural gas contains only one atom of carbon and only four atoms of hydrogen. It is so light that it is a gas at room temperature. When it burns, it essentially decomposes into carbon and hydrogen which in turn bond to oxygen separately to form carbon dioxide gas, $CO_2$, and water vapor, $H_2O$. Every molecule of fuel produces one carbon dioxide molecule and two water molecules during combustion, which are the ultimate exhaust products of clean burning natural gas.

Diesel fuel, however, has many more atoms of carbon and hydrogen stuck together, for example $C_{15}H_{32}$. This means, in this example, that every molecule contains fifteen carbon atoms and thirty-two hydrogen atoms bonded into one molecular cluster. These molecules are so heavy that they form dense liquids at room temperatures. In order to burn, or rather, chemically combine with oxygen to produce heat, each of the fifteen carbon atoms and thirty two hydrogen atoms must break apart from each other so that every single carbon atom can form, with oxygen, carbon dioxide, $CO_2$, and every hydrogen atom can form, with oxygen, water vapor, $H_2O$. This is exactly the same process as burning natural gas, $CH_4$, but because there are so many more atoms clustered into each molecule, it is a lot more difficult to break all of the atoms apart from each other. When the atoms do not break apart cleanly and easily they do not all form $CO_2$ and $H_2O$. Instead a lot of carbon atoms form their own clusters, without oxygen, to form soot, which is usually what you see as black smoke coming from the exhaust system on many large diesels. As well, many molecules of partially decomposed fuel leave the exhaust completely unburned accounting for the acrid smell diesel engines are notorious for.

The idea is that natural gas burns clean because it is composed of light molecules of only one carbon atom and four hydrogen atoms stuck together and diesel fuel burns poorly because it is composed of heavy molecules of, for example, fifteen carbon atoms and thirty two hydrogen atoms stuck together. The burning process itself doesn't change, disregarding the speed and reaction time of combustion in this example, only the complexity of molecular disintegration into atoms makes it more difficult to burn cleanly all of the atoms. It is very clear that in order to burn all of the atoms in any given fuel, the molecules of the fuel must be shattered.

Clean burning high performance liquid fuels, such as high octane aviation fuel, are made of the same components as diesel fuel and natural gas. However, their molecular structures are refined in such a way as to have weak molecular bonds allowing them to decompose easily and quickly. The refining process can be very simple or increasingly complex, depending on the desired molecular bonding structure. To refine fuel it helps to understand that crude oil contains every type of hydrocarbon cluster imaginable from very light liquids to heavy oils and even tar all mixed up together. Refiners ideally want to separate each group out so that the light liquids can be used for aviation (high octane properties) and the middle groups, which are heavier, to be used as diesel fuel etc. Distillation practices help separate some of these fuels into their similar molecular weight categories but it is relatively slow and not an exact science. The distillation process basically relies on the principal that when heated at low temperatures the lighter weight molecules, because they are bonded with only a few carbon and hydrogen atoms, become gases and subsequently rise to the top of the distillation tower and are extracted. When the temperature is raised slightly higher, the next heavier group of hydrocarbon clusters rise to the top for extraction and so on. As the hydrocarbon clusters become bigger however, they do not easily separate or break apart from each other. The bigger the molecule, the stronger the forces of attraction hold them together. Refiners learned in the 1930's that if they ran hydrocarbon fluids through metal catalysts the electro-chemical reactions between the hydrocarbon clusters and metal in the catalyst caused the hydrocarbon molecules to break apart into smaller clusters. This is because the electron orbits that are shared between the clusters of atoms are drawn, or rather, detached from each other effectively breaking the links holding them together. These links, somewhat like a chain, break apart at random and usually the molecules become lighter and smaller but of any given number of atoms in their cluster, i.e. molecular weight is less but there may be any random number of atoms in each cluster. This is considered a non-selective catalytic reaction because the molecules are affected and reduced but not selectively to a certain size or structure.

The combustion of hydrocarbon based fuels does not have to produce toxic pollution. The chemical reactions involved in the combustion process produces heat energy. Although this heat energy is the desired product of combusting fuel, it is difficult to manipulate and convert into controlled energy. The burning or combustion of hydrocarbon fuels, in an internal combustion engine, produces a wide spectrum of electromagnetic radiation, which only a portion of can be converted into useable heat, or rather, pressure. The rest is usually wasted because the gaseous molecules in the combustion chamber are unable to absorb some of the intense radiation produced during combustion reactions. Some of the energy that is absorbed effectively accelerates the vibration levels of the gaseous molecules allowing them to apply greater pressure on their surroundings. In an internal combustion engine, this pressure is converted into mechanical movement or power. Only about one third of the heat energy produced during combustion, however, is converted into useable pressure. The remainder of this energy is not entirely lost, but unfortunately can be responsible for the production of NO-x emissions, excess vibration, excess heat in other parts of the combustion apparatus, and even excessive noise. As well, spontaneous, incomplete combustion reactions produce other types of unwanted, toxic emissions, such as carbon monoxide and soot.

Inconsistencies in combustion reactions as a result of a fuel's composition or combustion equipment, being unable to completely burn the fuel, are largely responsible for the formation of toxic emissions. However, another reason is that internal combustion engines are unable to contain all of the pressure, created from the heat of burning gases, allowing pressure and contaminants to enter the crankcase cavity. These contaminants combine with the vaporized lubricating oil in the crankcase to produce blow-by emissions and pressure that must be vented from this part of the engine. Blow-by emissions contain complex hydrocarbon compounds of varying molecular weights and configurations. An inadequate ventilation system will reduce the service life of an engine if these harmful, toxic gases are not allowed to escape. These toxic fumes are either directed back into the air intake system of the engine, where their complex molecular configurations impede me oxidation-reduction process causing a loss of power, an increase in exhaust emissions and contamination of engine internal components with carbon based residue, or because of these reasons, the toxic fumes are simply vented into the atmosphere.

NO-x emissions can also be a result of a fuel's poor combustion characteristics, assuming properly functioning equipment and correct air-fuel ratios for complete combustion. When the fuel does not vaporize and decompose easily, the reaction time once combustion is initiated, is delayed with a corresponding increase in combustion intensity. The combustion zone may accelerate from a relatively slow speed to an extremely high speed almost instantaneously. This extreme imbalance in velocity produces significantly higher energy levels, radiation with shorter photon emissions, which may ultimately become actinic. Photolysis is a term used to describe chemical decomposition by electromagnetic radiation. It can occur when combustion reactions accelerate to a range where the photon emissions released contribute to further chemical reactions, rather than normal thermal decomposition reactions of regular, controlled combustion. The actinic radiation produced during non-uniform, intense, combustion reactions tends to decompose, not only the fuel's molecular clusters, but the otherwise inert nitrogen molecules as well, ultimately contributing to undesirable chemical reactions and the production of unwanted toxic NO-x emissions.

In order to reduce unwanted, toxic emissions, the combustion process ideally requires manipulation.

Combustion is a chemical process involving the transfer of electrons between atoms known as oxidation-reduction. In this process liquid fuels must be vaporized and dissociated into atoms or free radicals before they can combine with oxygen to form new substances. Under ideal conditions, a great deal of energy is released and carbon dioxide and water are formed. Combustion is a process that is not completely understood, it seems, however, that free radicals are the key elements to promote and propagate controlled chemical reactions. Radicals are the reactive intermediates responsible for dissociating the large clusters making up the fuel's molecular compounds into individual atoms when they only then can be oxidized to produce heat. This is a chain branch disintegration process that progresses throughout the combustion chamber until the fuel is consumed. Under ideal conditions, using high quality fuels, the reaction rate, chemical reactivity, is rapid and the combustion zone proceeds progressively but smoothly throughout the combustion chamber. The intensity of the reaction zone, which ultimately determines the intensity of electromagnetic energy released, has a significant effect on the vibrational energies imparted on the molecules in the combustion chamber, which significantly affects their heat release potential. The vibrational energies obtained by the gaseous molecules in the combustion chamber, under ideal combustion reactions, are transformed into organized molecular motion that in turn produces maximum momentum, or rather maximum potential mechanical energy. Organized molecular motion of a working fluid, namely the nitrogen and products of combustion in the combustion chamber, enables the electromagnetic energy produced during combustion to be transformed into controlled pressure with minimum entropy. Entropy, or wasted heat energy, is largely a result of random, chaotic vibration energies released during uncontrolled, excessively rapid combustion reactions.

Ideally, for an engine, or combustion equipment, to function at their maximum potential with minimum toxic emissions and greatest efficiency with lower maintenance, vibration and operating temperatures (minimum entropy), the fuel must be able to decompose easily and to propagate combustion reactions with controlled, stable velocities with an absolute minimum of shock waves. As well, toxic crankcase emissions should not be vented into the atmosphere or air intake system without considerable modifications made to their molecular structures.

There are a number of different catalytic devices or the like that attempt to treat the fuel prior to it being mixed with oxygen in a combustion space. One such fuel catalyst is commercially available from Rentar Environmental Solutions, Inc. and is constructed so that a reaction occurs in the catalyst device which separates the clustered molecules so more of the fuel molecules surface area is exposed to oxygen at the time of combustion.

The Rentar catalyst falls into the category of being a non-selective catalyst because it contains a mixture of many dissimilar metals that randomly break the fuel's molecular structures as the fuel passes through it. The fuel molecules may become smaller but not necessarily smoother or better burning, which is what a selective catalyst would accomplish. This is why aviation fuel is considerably more expensive because the molecular structures of the fuel molecules are arranged in such a way as to not only break apart easily and cleanly but also burn very smoothly. Selective catalysts are very difficult to design because the temperature, pressure and reactivity must be chosen carefully in order to obtain the desired restructured molecule.

Other emissions equipment and related devices that serve to solve the above problems likewise suffer from certain deficiencies and disadvantages. In particular, the following is a list of different types of emissions equipment, along with their associated deficiencies: (a) PCV (positive crankcase ventilation system)—contamination, poor combustion, worse emissions; (b) EGR (exhaust gas re-circulation)—contamination and power loss; (c) catalytic converter—increased back pressure, power loss, heat generation; (d) particle matter traps—increased back pressure, power loss, regular maintenance schedules, carbon accumulation issues; (e) retarded timing, to reduce No-x emussions—carbon accumulations, power loss, higher hydrocarbon emissions; (f) filters etc. for crankcase emissions—require periodic cleaning, non catalytic, require wires or electrical connections, liquid or filtering mediums are too restrictive for most diesel engines, liquid and vapor separators are generally large and non universal; (g) fuel catalysts—are generally made of unusual materials, difficult to obtain or produce, expensive, restrictive to fluid flow, un-useable for crankcase emissions, non-uniform assembly procedures produces inconsistent reactions, installation sensitive in regards to position, distance close to engine for heat, vibration or increased reactivity, many require specific tortuous passages of fluid flow, agitation, turbulence, electrical stimulation, friction or even special housing materials to produce the desired reactions.

It would thus be desirable to produce a selective catalyst (catalytic device) for use in a wide range of different applications, including in fuel lines and fuel systems to treat and process fuel prior to it being combusted, in crankcase ventilation systems for treating and processing harmful emissions from the crankcase and in other engine related locations where emissions and/or fuel can be processed prior to discharge and/or combustion.

SUMMARY

The present invention is directed to catalytic devices and systems that are constructed to modifying the molecular configurations of hydrocarbon based emissions and fluid fuels for the purpose of improving the combustive properties of these materials, improving energy transfer associated with combustion that takes place in these locations, reducing the levels of emissions, etc.

According to one exemplary embodiment, a catalytic device tor processing a fluid containing hydrocarbons includes a catalytic body formed of at least three metallic materials arranged in a layered structure. The layered structure has a compressed region formed along a longitudinal length of the layered structure.

In another aspect, a catalytic device fluid containing hydrocarbons includes a reactive body formed of a plurality of materials arranged in a layered structure. The plurality of materials is formed of at least two different catalytic materials. The reactive body has an inner core member and at least one inner cavity formed within the body. In addition, the layered structure has regions of different densities and is permeable to the fluid along the length thereof to permit flow of the fluid through the layered structure, including through the inner core member.

The present invention is also directed to a system for processing a fuel containing hydrocarbons that includes a source of fuel and a fuel line that is in fluid communication with the source of fuel, as well as a catalytic body disposed within the source of fuel and in fluid communication with the fuel line such that fuel is drawn into contact with the catalytic body as it is drawn into the fuel line for delivery to another location. The catalytic body is formed of a plurality of metallic materials arranged in a layered structure that is rolled into a predetermined shape and is permeable to fluid flow. The rolled layered structure has a compressed region formed along its longitudinal length.

In another aspect, a system for processing for processing emissions containing hydrocarbons includes: a source of emissions and a catalytic body disposed within a flow path of the emissions such that the emissions are drawn into contact with the catalytic body as the emissions flow from one location to another location. The catalytic body is formed of at least three metallic materials arranged in a layered structure that is rolled into a predetermined shape and is permeable to fluid flow. The rolled layered structure has a compressed region formed along its longitudinal length, wherein the plurality of metallic materials are formed of at least two different materials. The catalytic body further has an inner core member having a first density and a region that has a second density which is less than the first density, wherein the compressed region is formed in a region where the inner core member has a maximum density.

In one embodiment, the source of emissions is a component of crankshaft equipment associated with a combustion engine, with the flow path of the emissions flow traveling through a crankshaft ventilation tube in which the catalytic body is disposed.

In yet another aspect, the present invention is directed to a method for processing a fuel containing hydrocarbons and hydrocarbon containing emissions from a crankcase ventilation system including the steps of: (a) directing the fuel through a first catalytic device; and (b) directing the hydrocarbon containing emissions through a second catalytic device that is disposed in the crankcase ventilation system.

BRIEF DESCRIPTION OF DRAWINGS

The foregoing and other features of the present invention will be more readily apparent from the following detailed description and drawings of illustrative embodiments of the invention wherein like reference numbers refer to similar elements throughout the several views and in which:

FIG. 3 is a cross-sectional view of the cylindrically shaped rolled layers of material taken along the line 3-3 of FIG. 2;

FIG. 4 is a perspective view, partially broken away, of the cylindrically shaped rolled layers disposed in a housing to form the catalytic hydrocarbon processing system according to the first embodiment;

FIG. 10 is a perspective view of various layers of material that are used to form a catalytic hydrocarbon processing system according to a third embodiment;

FIG. 10A is a cross-sectional view taken along the line 10A-10A of FIG. 10;

FIG. 11 is a perspective view of the layers of material of FIG. 12 rolled into a cylinder and including a number of notches formed at one end to define a support structure;

DETAILED DESCRIPTION OF THE PREFERRED EMBODIMENTS

Figure 2:
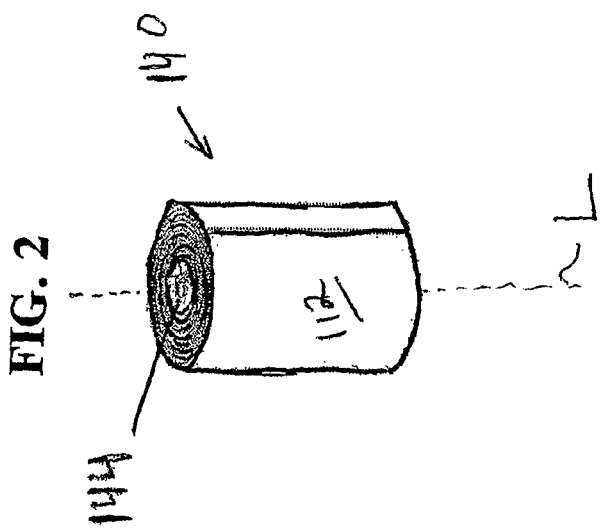
FIG. 2 is perspective view of the layers of material of FIG. 1 rolled into a cylinder.

An object of the present invention is to achieve a catalytic processing system and method of altering the combustion characteristics of hydrocarbon fuels and emissions for the purpose of emissions reduction and to provide greater control of the vibrational energies imparted on the molecules occupying the combustion chamber, or zone, during and after combustion. The catalytic devices and systems made in accordance with the present invention preferably alter, through electro-chemical means, the molecular structures of hydrocarbon emissions and fluid fuels in order to improve chemical reactions and combustion intensities during the combustion process for the reduction of emissions and improved energy transfer.

In view of the foregoing and the problems associated with conventional devices, the present hydrocarbon catalytic processing system is constructed to produce chemically reactive intermediates from recycled crankcase emissions according to one exemplary embodiment. Without wishing to be bound by any particular theory, it is believed that these normally toxic poor burning compounds are converted into reactive fragments that, not only burn better when admitted into the combustion chamber, but they significantly enhance the combustion characteristics of hydrocarbon fuels. This effectively eliminates the problems normally associated with recycled, untreated toxic crankcase emissions that normally aggravate and disrupt the combustion process. This is a bi-functional catalyst containing hydrogenating and acidic components. While not being bound to any particular theory, the materials inside are chosen specifically for their abilities to breakdown the hydrocarbon components by forming from them carbonium ions (positively charged molecular fragments) by way of the protons in the acidic function. These ions are so reactive that they change their internal molecular structures spontaneously and breakdown to smaller, reactive fragments.

Adding free radicals or reactive intermediate compounds directly into the combustion chamber to mix with the air and fuel has a profound effect on the oxidation-reduction process. Instead of the combustion process proceeding only by thermal agitation and random molecular collisions, these newly introduced reactive particles immediately dissociate large fuel molecules into fragments exposing them to the oxygen far sooner and under cooler temperatures. The effects of enhanced free radical activity and their subsequent chain branch disintegration reactions are immediately transposed into producing a smoother, slower and more controlled combustion process. When the combustion process is smooth and more controlled the electromagnetic energy is transformed more completely into unified thermal energy, which is significantly more useful, and more importantly, produces significantly lower toxic emissions.

As well, this processing system is adaptable to hydrocarbon fluid fuels by simply splicing and installing the device onto the fuel line of the desired combustion equipment. In this adaptation the fuel is simply directed through the catalyzing system and processed and converted into having molecular structures with improved combustion characteristics. Unlike processing crankcase emissions into reactive intermediates, however, the fuels' molecular structures are modified or rearranged into having, more controllable decomposition characteristics, improved chemical reactivity, and stabilized combustion propagation reaction characteristics. Fuels with the resultant modified molecular configurations produce more consistent levels of electromagnetic energy release ultimately providing improved energy or work transfer and most importantly, lower toxic emissions release.

In an alternative embodiment of the present invention, the hydrocarbon fuels that are treated with the catalytic device are low molecular weight hydrocarbon fuels. Low molecular weight hydrocarbon fuels that can be employed include, for example, natural gas, ethylene, acetylene, propane, butane as well as other low molecular weight hydrocarbons that are known in the art of combustion. Thus, the catalytic devices of the present invention are also contemplated for use with the low molecular weight hydrocarbons used as a fuel source in furnaces, boilers, and even barbeques. Typically, when the catalyst device is used in this capacity it can be attached to the fuel line of the desired equipment.

As described in great detail below, the catalytic devices and systems according to the present invention are based on a layered structure formed of dissimilar metallic materials and manipulated into a particular shape. The arrangements of dissimilar metallic materials, to overlap each other one layer at a time to virtually any desired depth, satisfies a solution to the many previous experienced undesirable characteristics, such as ease of manufacturing, complete and reproducible consistency in density of dissimilar elements, flow capacity, and, of course, performance improvements. Each of the preferred materials, in screen form, needs only to be one layer in thickness and when overlapped with one another, form what may be described as an electrolytic capacitor. Without wishing to be bound by any particular theory, it is believed that the hydrocarbon fluids, liquid or vapor, emissions or fuel, act as the electrolyte to effectively activate the electrochemical reactions necessary for the electron transfer process to proceed. The ions produced as a result of the electrochemical reactions are so reactive that they change the crankcase emissions or fuel's molecular structures spontaneously, breaking them down to smaller reactive fragments. When hydrocarbons, emitted from the crankcase emissions vent tube, are processed, the hydrocarbons are broken down into reactive fragments, that when introduced into the combustion chamber, dissociate the fuel molecules into their constituent elements by way of free radical chain reactions. This has significant effects on the combustion process.

When hydrocarbon fuels are passed through the catalytic elements, electron transfer reactions cause the fuel molecules to undergo any number of structural reorganization reactions. These reactions can include isomerization, aromatization, dehydrogenation and even polymerization conversion processes. Any number of these reactions are possible and they result in altering and improving the fuel's combustion characteristics. Generally, the fuel's newly altered molecular structures resist spontaneous detonation reactions allowing a smoother, more controlled combustion process. The active sites responsible for producing the electron transfer reactions in this catalytic reactor likely occur at the contact surfaces between the specific dissimilar metallic elements as well as other metallic faces of the elements.

By using dissimilar metallic materials, there is a great degree of latitude in how to construct and shape the catalytic device and in one exemplary embodiment, the dissimilar metallic materials are cut into long strips, with the widths and lengths determined by its application, longer strips. When rolled together, this type of layered structure provides more reactive sites and wider strips provide a greater surface area for larger applications. The dissimilar metallic materials can be positioned evenly over one another to form specific alternating layers of dissimilar metallic screens with similar thickness and densities and then the screens are rolled together in such a way as to form a cylinder with multiple, alternating contact sites of these dissimilar elements. This method allows the hydrocarbon fluids to pass through the alternating layers of elements effectively providing multiple reactive sites at every point of contact between the metallic elements and hydrocarbons. This method allows complete adjustability to the desired number of reaction sites required by the intended application of this catalytic reactor. This flexibility is important because some hydrocarbon compounds, fuels and emissions, and their potential applications require more processing than others. Many fuels, such as diesel fuel for example, require more reactive sites to effectively process their molecular structures into ones with having improved combustion characteristics. While other fuels, such as gasoline, require less reaction sites in order to avoid over processing, which would ultimately reduce combustion efficiency. As well, crankcase emissions are sensitive to over processing and therefore may require a certain level of reactivity, which again, is determined by adjusting the number of alternating layers of metallic screen elements.

This adjustability allows unlimited applications from the smallest engine's fuel line to the largest diesel engine's crankcase ventilation tube, with only the requirements of cutting wider strips and/or longer lengths of catalytic screen materials to accommodate the required applications.

Described below are several embodiments that embody the present invention and function as improved catalytic devices/catalytic processing systems as illustrated in the accompanying figures.

In accordance with one aspect of the present invention, a catalytic hydrocarbon processing system 100 according to a first embodiment is illustrated in FIGS. 1-4. As best shown in FIG. 4, the catalytic hydrocarbon processing system 100 includes a first catalytic body (catalytic device) 110 that is formed of a plurality of separate materials that are formed according to a predetermined shape and disposed within a housing 120. According to one embodiment that is illustrated in FIGS. 1-4, the first catalytic body 110 is formed of three separate, different materials (dissimilar materials), namely, a first material 112, a second material 114, and a third material 116, that are layered with respect to one another and are formed according to a predetermined shape as by rolling or otherwise manipulating the structure. However, it will be appreciated that two materials or four or more materials can be used to form the body 110.

Figure 1A:
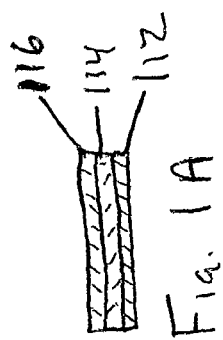
FIG. 1A is a cross-sectional view taken along the line 1A-1A of FIG. 1.
Figure 1:
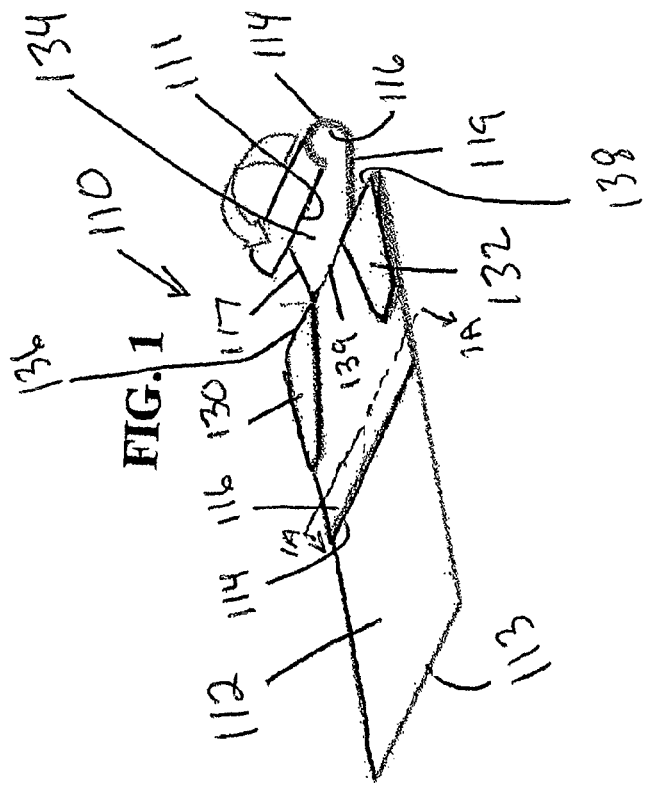
FIG. 1 is a perspective view of various layers of material that are used to form a catalytic hydrocarbon processing system according to a first embodiment.
Figure 6:
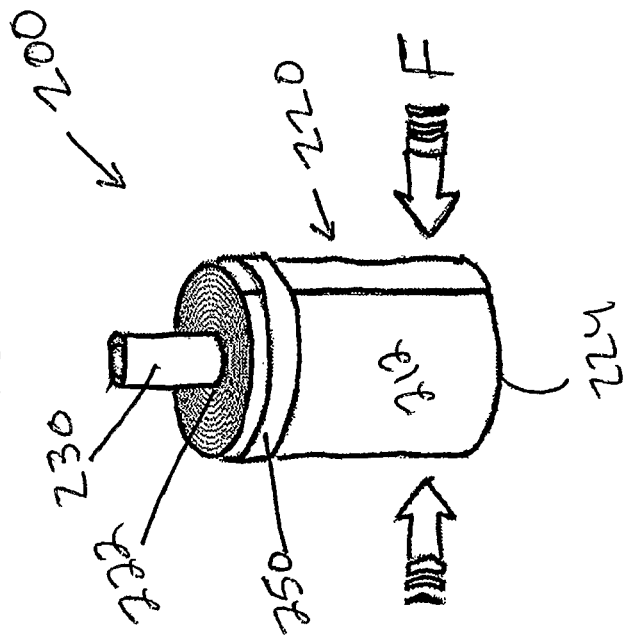
FIG. 6 is a perspective view of the layers of material of FIG. 5 rolled into a cylinder.
Figure 5A:
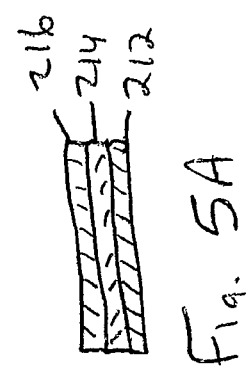
FIG. 5A is a cross-sectional view taken along the line 5A-5A of FIG. 5.
Figure 5:
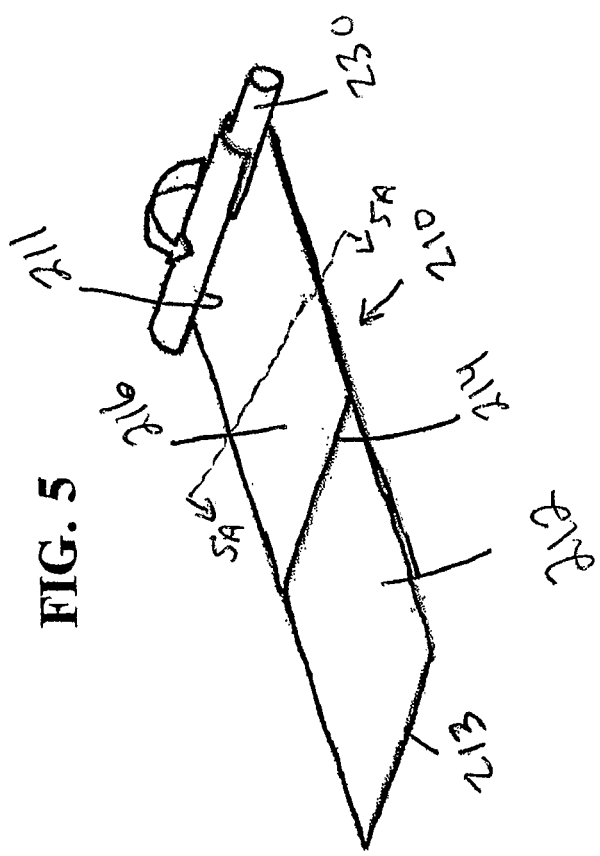
FIG. 5 is a perspective view of various layers of material that are used to form a catalytic hydrocarbon processing system according to a second embodiment.

To form the layered structure illustrated in FIG. 1, the first material 112 is cut into a first strip, the second material 114 is cut into a second strip, and the third material 116 is cut into a third strip. The strips 112, 114, 116 can be formed to have predetermined widths; however, the width of each strip 112, 114, 116 is preferably the same. However, the lengths of the strips 112, 114, 116 are preferably not the same, with the first strip 112 having a length that is greater than the length of the other two strips 114, 116, which in the illustrated embodiment have approximately tile same lengths. As described below, by forming the first strip 112 in a length greater than the other lengths, the first strip forms and completes a final wrapping layer when the three materials 112, 114, 116 are rolled into the cylindrically shaped structure shown in FIG. 2.

The three materials 112, 114, 116 are arranged such that the first material (strip) 112 is the outermost material, the third material 116 is the innermost material and the second material 114 is the intermediate material due to its position between the first and third materials 112, 116. The three strips 112, 114, 116 are made of catalytic materials that are suitable for the intended application and environment (e.g., chemically modifying the molecular structures of the hydrocarbons in the hydrocarbon containing fluid (fuel, emissions, etc.)) and according to one exemplary embodiment, the materials 112, 114, 116 are three different metallic materials (as used herein "metallic materials" refers to materials that are either metals or metal alloys or a combination thereof). For example and according to one embodiment, the first strip 112 can be a stainless steel layer, the second strip 114 can be a copper layer, and the third strip 116 can be an aluminum layer. By having a layered structure defined by a plurality of metal mesh materials, the total amount of surface area where dissimilar metals are in contact with one another is substantially increased compared to other designs where the metals are not in layered structures but instead are arranged as two separate metal regions. By employing a layered structure formed of multiple catalytic materials, the hydrocarbon containing fluid (e.g., fuel or gas) that is to be treated by the catalytic device (system 100) of the present invention contacts large surface areas of adjacent dissimilar metals which provide reactive sites where the hydrocarbons can be processed into safer, reactive fragments in the manner described hereinbefore. While not being bound to any particular theory, the present applicants believe that each of the metallic screens has different catalytic properties resulting in a particular fluid being catalytically modified in a particular way when contacting one metallic screen and therefore, a combination of dissimilar metallic catalytic materials permits the fluid to be catalytically processed in different ways as the fluid contacts the different dissimilar metallic screens. The layered nature of the present devices presents a compact design.

As previously mentioned, any number of different dissimilar catalytic materials can be used in the practice of the present invention, including metals, metal alloys, and combinations thereof. For example, one or more of the catalytic materials can be a transition metal selected from the group consisting of: Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Ununnilium, Unununium, Ununbium; or they can be one or more of the materials that are commonly known as the "other metals" on the periodic table and include Aluminum, Gallium, Indium, Thallium, Tin and Lead. One exemplary catalytic material that is used in the production of the catalytic systems of the present invention is stainless steel. As is known, a stainless steel material refers to any of a number of steels that are alloyed with at least 10 or 12 percent chromium and sometimes contain other elements and that are resistant to corrosion or rusting associated with exposure to water and moist air. It will be appreciated that the above list is not intended to be an exhaustive list of suitable catalytic materials, but instead, merely lists exemplary materials that are suitable for certain intended applications.

To assemble the first catalytic body 110, the three materials 112, 114, 110 are arranged as overlaying strips of material in the order described above and with the strips having the same width. The length of the first strip 112 is greater than the lengths of the second and third strips 114, 116 and in one embodiment, the second and third strips 114, 116 have a length that is equal to or less than ½ the length of the first strip 112. As a result, when the three layers/strips 112, 114, 116 are laid over one another, one end or edge 111 of the layered structure contains all three layers 112, 114, 116 that are positioned evenly, while the opposite end or edge 113 contains only the edge of the first layer 112. At the end 111, the three layered structure (catalytic body 110) is cut along two lines, namely, a first cut line 117 and a second cut line 119, that are arranged in a non-parallel manner. In other words, the first and second cut lines 117, 119 are formed along axes that intersect one another. The lengths and precise positions of these cut lines 117, 119 are variable depending upon the particular application; however, the first and second cut lines 117, 119 extend to the end 111 so as to form a pair of outer strips or layered structures 130, 132 that are on either side of an inner section or inner layered structure 134. The outer layered strips 130, 132 and the inner section 134 are each separate from one another so that each is independent and separate from the others and can be folded and/or rolled independently.

It will be appreciated that the lengths and positions of the first and second cut lines 117, 119 determine the width of the inner layered structure 134 and thereby, determine the density of the inner core of the body 110 as explained below in greater detail. In addition, the lengths of the first and second cut lines 117, 119 determine the outer diameter of the inner core of reactive materials (layers 112, 114, 116). This measurement is typically determined by the intended application for the system 100. For example, a small inner core diameter is typically used in automotive applications, boilers, muffler systems (emissions systems), or barbeques or other similar type applications, while a larger inner core is used on diesel engines or furnaces, etc. Also, liquid fuel processing devices usually require a denser inner core than that required for vented crankcase emissions applications.

The inner section 134 formed between the two cut lines 117, 119 is rolled very tightly toward the second end 113 for a predetermined distance. In particular, the inner section 134 is rolled until a point or line 139 is reached by the rolled inner section 134. The pair of outer layered strips 130, 132 is folded along first arid second fold lines 136, 138, respectively, toward the second end 113 so as to fold the outer layered strips 130, 132 on top of itself. In the illustrated embodiment, the line 139 and the fold lines 136, 138 are formed along the same transverse axis across the width of the layered body 110. However, the line 139 and the fold lines 136, 138 do not have to be co-linear but instead can be offset from one another.

Once the outer layered strips 130, 132 are folded and pressed flat against the remaining layered materials, the entire layered structure is then tightly rolled in such a way to form the rolled catalytic structure shown in FIG. 2 and generally indicate at 140. The rolled structure 140 is partially hollow in that the ends 142, 144 thereof are in the form of a pair of hollow cylinders that define inner end compartments or cavities 146 which are formed as a result of the outer layered strips 130, 132 being folded prior to rolling the entire layered structure as shown in FIG. 3. Another result of this construction is that the dense inner core (inner section 134) forms the inside of the rolled structure 140.

FIG. 3 is a cross-sectional view of the rolled structure 140 and illustrates the formation of the dense inner core (inner section 134), as well as the hollow cylindrical ends 142, 144. In addition, the three general material layers 112, 114, 116 are illustrated.

The actual diameter of the hollow cylinder formed at ends 142, 144 can vary and will depend upon the precise intended application for the system 100. For example, on a 450 hp diesel engine crankcase ventilation line, the diameter of the hollow cylinder can be about one inch, while in a small fuel line application, the diameter may be only about ¼ inch. For other applications, the diameter can be outside of either of the above values.

It will be appreciated that as the materials 112, 114, 116 are rolled over one another to form the cylindrical structure 140, each layer 112, 114, 116 represents a contact site for chemical reactivity. With relatively little effort or expense, the rolled cylindrical catalytic structure 140 can be adjusted to any desired diameter and/or reactivity to fit a given application. The densities of the materials 112, 114, 116 have an effect in determining the number of alternating dissimilar materials and in one exemplary embodiment, the materials 112, 114, 116 are provided in screen form, with the density being calculated by the material thickness and openings per square inch. In one exemplary embodiment, the materials 112, 114, 116 are each in the form of a screen materials that is approximately 0.010 to 0.040 inch thick with approximately 20 openings formed in the screen per square inch. However this is merely one exemplary type of screen that is suitable for certain intended applications for the system 100. Very fine material, for example, with 60, or more openings per square inch, is possible for fuel applications but may restrict the crankcase ventilation excessively. It is desirable to produce the maximum number of reactivity sites in the minimum space necessary, but it is also very important to maintain as minimum restriction as practical. Hydrocarbon emissions, as vented from large diesel engine crankcase vents, are capable of blocking excessively small passages and it is a factor that must be considered when configuring the density of the structure 140 for its intended application.

Once the overall diameter of the roll of reactive materials has been determined, the final layer (first layer 112 in the embodiment of FIGS. 1-4) is wrapped around the roll to form an outer shell of this material (i.e., an outer winding) as shown in FIGS. 2-3. The entire roll of materials (the rolled structure 140) is then slightly compressed along the circumference of the outer diameter in the center region 141 of the structure 140 and perpendicular to a longitudinal axis L of the structure 140. The compression in this center region 141 effectively increases the density of the materials in the center region 141 where the inner core 134 is located.

As will be described below, as the hydrocarbon fluids enter one end 142, 144 of the rolled structure 140 and pass through the compressed center section, the fluids are slightly restricted causing an increased flow of fluid in the other areas of the reactive elements 112, 114, 116 due to the resistance caused by the compression. This allows a greater use of reactive sites inside the roll of materials without restrictive plates or other accessories inserted to divert or control the fluid flow. Once compressed in this manner, the materials 112, 114, 116 retain this shape and no further procedures or materials are required for assembling the reactive components of the system 100.

The general flow of the fluid is indicated by arrows in FIG. 3 and it can be seen that there are two distinct filter regions or areas 102, 104 where the fluid passes through the filtering elements defined by the rolled structure 140. More specifically, the fluid initially enters at one end of the structure 140 and flows longitudinally within the hollow end 142 until the fluid contacts the dense core 134 which acts as permeable barrier in that it causes some but not all of the fluid to flow radially outward through the cylindrical rolled structure 140. This flow through the screens 112, 114, 116 enables the fluid to contact multiple reactive sites (catalytic reactive surfaces) due to the fluid having to flow from the inner opening of the rolled structure 140 to an exterior location. It will be understood, however, that the dense core 134 is formed of a fluid permeable material (i.e., the tightly compressed screens 112, 114, 116) that permits some fluid to continue to flow along the longitudinal axis of the structure 140 through the dense core 134 and to the other end 144. The fluid that passes through reactive elements associated with the first region 102 then must pass back through the reactive elements 112, 114, 116 associated with the second region 104 (a region on the opposite side of the dense core 134). In this manner, the fluid is placed into contact again with catalytic reactive sites or surfaces defined by the elements 112, 114, 116, where further catalytic reactions can occur and the hydrocarbon based fluid can be further processed before exiting through the outlet. This flow path results because in order for the fluid to exit the housing 120, the fluid must pass back into the hollow cylindrical cavity 146 at the end 144 since it is this area that is in fluid communication with the outlet of the housing 120 through which the fluid must flow in order to exit. It will be appreciated that the above described flow path is also dictated and controlled by pressure differentials that are found throughout the system 100 and within the housing 120 and in one embodiment, a pump mechanism draws the fluid along this flow path. As in most systems, the fluid wants to flow along a path of least resistance and therefore, flows to locations of lesser pressure, which is why the dense core 134 acts as a flow director that causes fluid to flow in a radially outward direction toward the housing 120.

In a number, if not most, applications, it is convenient to have the rolled cylindrical structure 140 disposed within housing 120; however, it will be understood that the housing 120 is not an essential component of the system 100 which can be thought of as functioning as an electrolytic capacitor. In other words, the system 100 can function without the housing 120 by simply placing the rolled structure 140 in the environment of the intended application, which can be in a fuel line, crankshaft emissions equipment, or any other situation where emissions are generated and are available for modification by the present system 100 into other compositions which are environmentally more friendly.

The housing 120 has a hollow body 122 that defines an inner compartment or cavity 124 that receives and holds the first catalytic body 110. The body 122 has an inlet 126 formed at one end thereof and an outlet 128 formed at the opposite end. The inlet 126 can be in the form of an inlet fitting to permit the housing 120 to be fluidly connected to a first external member, while the outlet 128 can be in the form of an outlet fitting to permit the housing 120 to be fluidly connected to a second external member depending upon the precise application in which the system 100 is employed.

The housing 120 is chosen to have a number of characteristics to satisfy reliable function in the environment that it will be used in. For example, the housing 120 is preferably made so that it includes one or more of the following characteristics: fuel and oil resistant, heat resistant to at least 250° F., light weight, sufficient strength to support the materials 112, 114, 116 disposed within, etc. The housing 120 can have any number of different shapes so long as the shape does not interfere with its intended function. One preferred material is thin walled stainless steel tubing because of its corrosion resistance, malleability, requires no painting or coating and it is durable. It is also preferred that the ends of the housing 120 can be sealed, as shown, and to have the illustrated threaded inlet fitting 126 and threaded outlet fitting 128 enabling fluids to enter the housing 120 and contact the rolled structure 140, flow through the reactive elements, and flow out of the structure 140 and out of the housing 120 without leaking or other unnecessary restriction.

The specific materials chosen to form tie catalytic body 110 (hydrocardon catalyst) are able to alter hydrocarbon compounds in liquid or vapor form. As well, the materials produce no known negative or detrimental effects in the intended applications in engines, combustion equipment, barbeques, or any other setting where undesired emissions are created. The metal materials used to form the layers 112, 114, 116 are all safe to work with and are malleable and by selecting the materials in screen form, allows a vast range and diversity in the density of the materials, as well as in formability and consistency. These features also make it possible to use this catalytic processing structure 140 in almost any system that may require hydrocarbon processing and modifying. Modifying hydrocarbon compounds with these specific materials, in the arrangements disclosed herein, produces electrochemical reactions that are not harmful to the catalyst or the equipment it is installed on. In addition, there is no danger of heat buildup or radiation and the catalytic reactions will occur under most temperatures, hot or cold. External heat sources, to promote reactivity, are not necessary, as well, electricity or vibration is not required to effect the electrochemical reactions occurring within the system 100. Also, the system 100 is capable of instilling electrochemical reactions with most hydrocarbon fluids. These features make it possible to use the system 100 to process hydrocarbon emissions, fuels and lubricants in vapor or liquid form.

Generally, it is convenient, as well as practical, to install the system 100 on or near the equipment requiring the altered hydrocarbon compounds, for combustion or other purposes. This may include the fuel supply line for furnaces or combustion equipment or the crankcase emissions ventilation tube on internal combustion engines. The device 100 needs only to be installed in such a way as to have the hydrocarbon fuels or emissions directed into one end of the threaded fittings 126, 128 on the housing 120 and allowed to pass into and through the rolled structure 140 where the fluid can be processed, and then directed out of the structure 140 to a combustion chamber or intake system or some other member depending upon the specific application. The threaded fittings 126, 128 on each end of the housing 120 make it adaptable, using proper adapters, to virtually any fuel line or crankcase ventilation tube, with secure leak proof connections. The distance from the equipment is not an important issue as it has been found that the freshly processed hydrocarbons emitted from the system 100 remain active for quite some time. The unit can be installed in any position, horizontal, vertical or inclined with no adverse effects. The present system 100 does not require maintenance and there are no fluids to spill, freeze, or change or even filters to clean. Although the system 100 is designed to be as lightweight and compact as possible, within reason, it is desirable to secure the unit to supporting member or bracket, etc., when convenient or necessary to the required installation.

When installing the system 100 on a crankshaft ventilation tube, especially on large diesel engines, it is preferable to have the toxic gases emitted from the engine to rise slightly to enter the system 100, as by flowing into the inlet 126. This permits excess condensed fluid to drain back into the engine when the engine is not operating. Most applications and installations are straightforward and relatively simple but nevertheless require deliberate, intelligent thought to effect a secure, functional and safe installation. Once again, based on Applicant's knowledge, there are no dangerous or negative side effects known to exist with this catalytic processing system. An installation should be trouble free and functional for several years.

It will be understood that the above examples and recited intended applications are merely exemplary and not limiting of the present invention since the catalytic devices disclosed herein have a wide variety of possible applications in general, the devices of the present invention is suitable where there is a desire or need to chemically modify a hydrocarbon structure in a fluid, such as fuel or emissions, in order to increase performance, reduce undesirable byproducts, etc.

Turning now to FIGS. 5-9, a catalytic hydrocarbon processing system 200 according to a second embodiment is illustrated. The system 200 is similar to the system 100 in that it contains a catalytic body 210 that is formed of a plurality of separate materials that are formed according to a predetermined shape. According to one embodiment, the catalytic body 210 is formed of three separate, different materials (dissimilar materials), namely, a first material 212, a second material 214, and a third material 216, that are layered with respect to one another and are formed according to a predetermined shape as is the case with the first embodiment. Similar to the first embodiment, the three materials 212, 214, 216 are metals and in one embodiment, the materials are the same as the materials of the first embodiment. In other words, the first material 212 is stainless steel, the second material 214 is copper and the third material 216 is aluminum.

The three materials 212, 214, 216 are preferably in screen form and are cut into strips of even, predetermined widths and lengths, for the required application, and are overlapped evenly over one another. While, the illustrated embodiment shows the three materials 212, 214, 216 having the same width and the first material 212 having a longer length, it will be appreciated that the lengths of all three materials 212, 214, 216 can be the same. As described above with reference to the first embodiment, by cutting the layer of the first material 212 to a greater length, the final wrapping layer (outer winding) of the rolled structure is defined by the first material 212. However, the lengths of the three materials can be the same. In the illustrated embodiment, the second and third materials 214, 216 have lengths that are less than the length of the first material 212.

The three materials 212, 214, 216 are in screen form and are all formed of dissimilar metallic materials with relative similarities in terms of their thickness, density and openings per unit area. For example, the screens can have a thickness between about 0.010 to about 0.040 inch and the screens can have between about 10 and about 60 openings per square inch, e.g., 20 openings per square inch.

The three layered structure (catalytic body 210) has a first end 211, where all three materials 212, 214, 216 are present in a layered manner, and an opposing second end 213 where only the first material 212 is present. The layered structure is then rolled beginning at the first end 211 and in a direction toward the second end 213 to form a cylinder with a center opening 215 of a predetermined diameter that depends upon the given application. In one embodiment, the diameter of the opening 215 is uniform along the longitudinal length of the rolled structure from the first end 211 to the second end 213. These materials 212, 214, 216 when rolled together form a rolled cylindrical structure 220 defined by alternating layers of dissimilar metallic screens. Once the roll of materials has reached a predetermined diameter, which is variable depending upon the precise application, a final of the first material 212 (e.g., stainless steel) is wrapped around the outer circumference of the rolled structure 220. In other words and as previously mentioned, the first material 212 can have a greater length so as to form an outer winding or wrapping of the first material 212. The length of the first material 212 that extends beyond the end edges of the overlaid second and third materials 214, 216 can be selected so that the first material 212 makes one complete circumferential winding around the outer circumference of the rolled structure 220.

The rolled structure 220 thus contains a first open end 222 and an opposing second open end 224 with the center opening 215 extending completely therethrough from the first end 222 to the second end 224. According to one exemplary embodiment, the one of ends 222, 224 is closed as by applying a compressive force F at the end 224 and in a direction that is perpendicular to the longitudinal axis of the rolled structure 220. The force F sufficiently compresses the rolled structure 220 at the end 224 so as to constrict and close the center opening 215 in this area of compression at the one end 224. The degree of compression along the longitudinal axis can be varied depending upon the nature of the force F and therefore, the extent and length of the rolled structure 220 that is compresses and constricted can be varied. In the illustrated embodiment, a compressive force F is applied to a degree that causes about ½ of the length of the rolled structure 220 to be compressed, thereby restricting and closing off about ½ the length of the center opening 215. Thus, the compressed rolled structure 220 defines a catalytic component/filtering device that is open only at one end, namely, the end 222.

When processing hydrocarbons fluids at the open end 222 (where center opening 215 remains open), a conduit member 230 can be inserted into the open center opening 215 at the end 222. The conduit member 230 is an open ended elongated hollow member, such as a tube, that has an outer diameter that is about equal to the diameter of the center opening 215 so that a frictional fit results between the conduit member 230 and the rolled structure 220 when the conduit member 230 is inserted therein. The conduit member 230 thus provides a pathway through the center of the compressed rolled structure 220 and terminating at the compressed end 224. The conduit member 230 and the rolled materials can be held in place using any number of conventional techniques. For example, a clamp 250 can be disposed about the outer circumference of the rolled structure 220 near or at the end 222. When the first material 212 forms the outer winding, the clamp 250 is thus disposed about this outer winding. Alternatively, the conduit member 230 and the rolled materials can be held in place by a compression fit around the outer diameter of the rolled structure 220. Other means for holding the structure can be used, such as hook and loop type strap, etc.; however and according to some embodiments, no means is needed to hold the structure in place in its rolled form.

Figure 8:
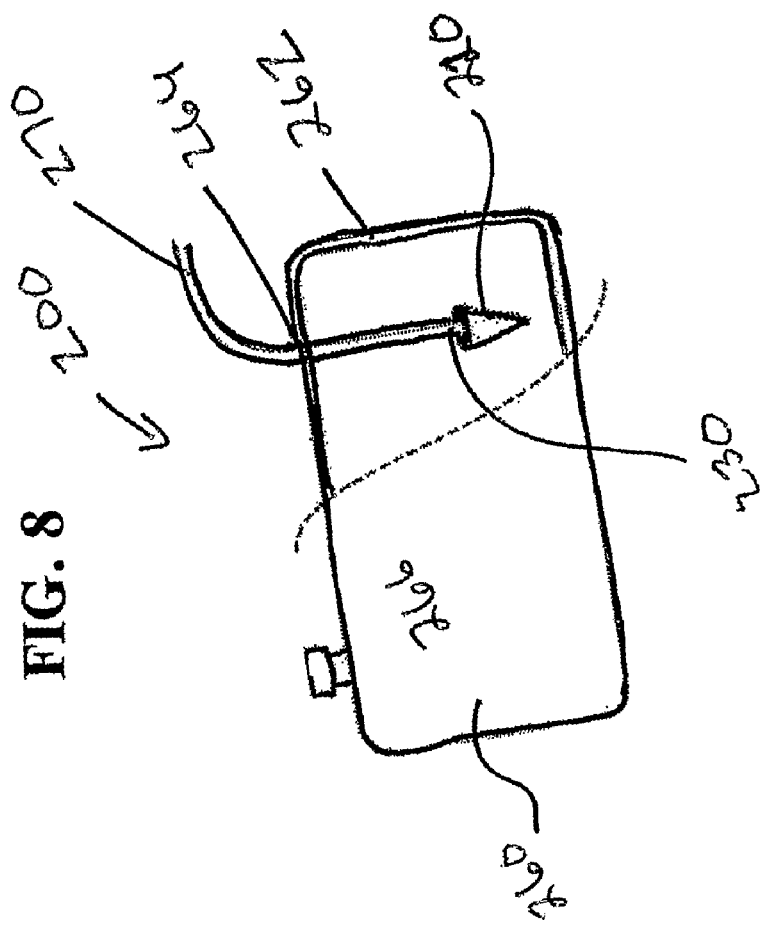
FIG. 8 is a cross-sectional view illustrating the placement of the catalytic hydrocarbon processing system of FIG. 4 inside a liquid fuel tank.
Figure 7:
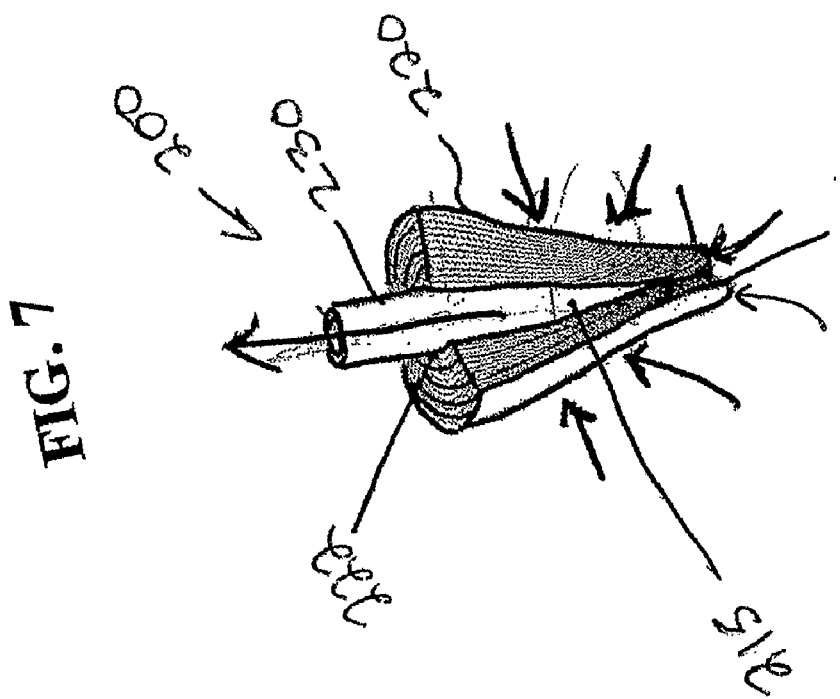
FIG. 7 is a cross-sectional view of the cylindrically shaped rolled layers of material taken along the line 7-7 of FIG. 6 and after being compressed at one end thereof.

FIG. 8 illustrates one particular application for the system 200, in its cylindrical rolled structure 220 form, as shown in FIG. 7, and in particular, the system 200 is shown as being used in combination with a liquid fuel tank, generally indicated at 260. The liquid fuel tank 260 includes a body or housing 262 with one or more openings 264 to permit insertion of a conduit or the like. The housing 262 defines an interior chamber of compartment 266. The system 200 is placed within the inner chamber 266, with the conduit that is inserted through the opening 264 being an extended length of the conduit member 230 in one embodiment or can be another conduit member, such as a fuel line 270, that is attached to the end of the conduit member 230.

Fuel that is present in the inner chamber 266 can be drawn through the filtering elements (the layers 212, 214, 216 of the rolled structure 220) and into the hollow conduit member 230 inserted into the center of the rolled structure 220 and in turn delivered to a fuel line 270 that is connected to the conduit member 230 and then transported through the fuel line 270 to a combustion source, generally indicated at 272. In this embodiment, the catalytic device (system 200) requires no housing and it is easily adaptable and adjustable to a wide varied of fuel tank systems. As previously mentioned, the modification and treatment of the hydrocarbons occurs due to the contact between the fluid containing the hydrocarbons and the surface area of the rolled structure 220.

The flow path of the fluid (e.g., fuel or gas emissions) is generally indicated by arrows in the cross-sectional view of FIG. 7. Since the conduit member 230 and the fuel line 270 are operatively connected to a pump or the like, the fluid is drawn to the interior of the rolled structure 220 due to a pressure differential. In particular, the pressure within the conduit member 230 and the center opening 215 is less than the exterior pressure, due to the effects of the pump, and therefore, the hydrocarbon containing fluid to be processed is drawn through the reactive elements (layers 212, 214, 216) and into the center opening 215 where the fluid can then be drawn into the conduit member 230 and then delivered to another location, as by use of the fuel line 270, etc.

As a result of the compressed nature of the rolled structure 220 along its longitudinal length thereof, the rolled structure 220 has different densities along its length and in particular, the compressed region where the center opening 215 is restricted and closed off defines the area of the greatest density, while the open area of the structure 220 at the opposite end has a lesser density. However, it will be understood that the rolled structure 220 is fluid permeable along its entire length and therefore, fluid can flow radially inward from the exterior, through the reactive elements and into the interior of the rolled structure 220, thereby being exposed to reactive sites. While fluid can flow through the compressed region of the rolled structure 220, this is a flow path of greater resistance and therefore, a greater amount of fluid will flow through the reactive elements in the other non-compressed regions of the rolled structure 220. In any event, the hydrocarbon containing fluid does flow through the reactive materials in order to flow out through the conduit member 230.

Figure 9:
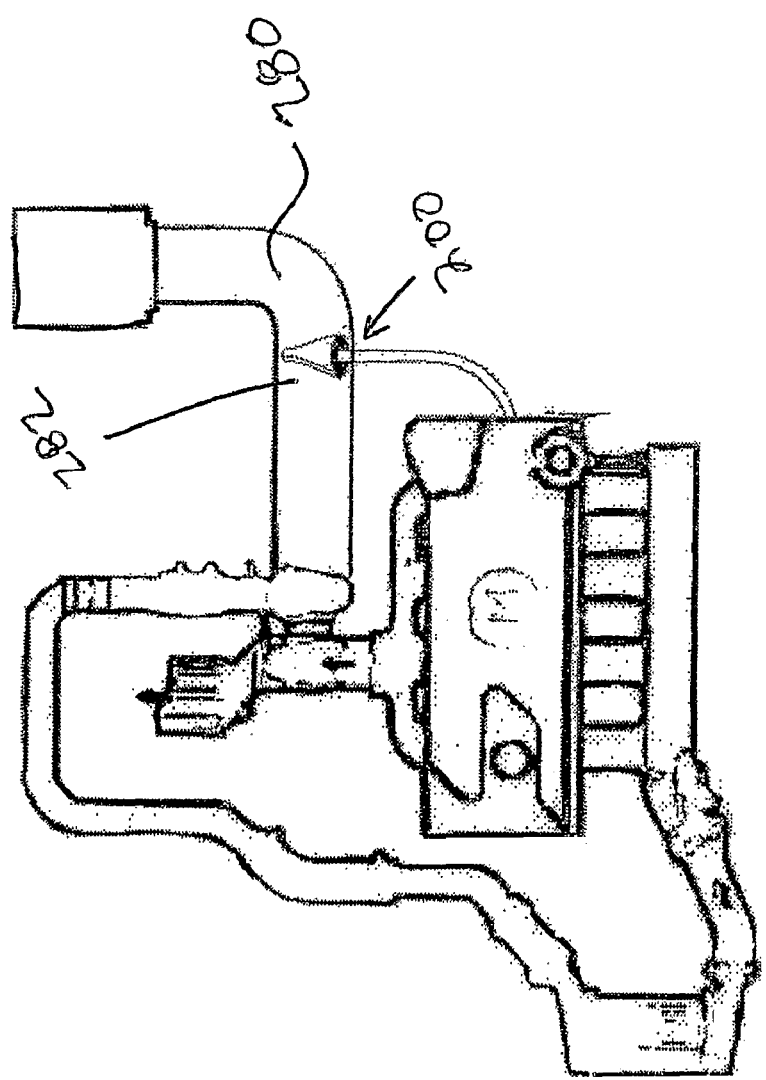
FIG. 9 is a cross-sectional view illustrating the placement of the catalytic hydrocarbon processing system of FIG. 4 inside a crankcase ventilation conduit.
Figure 12:
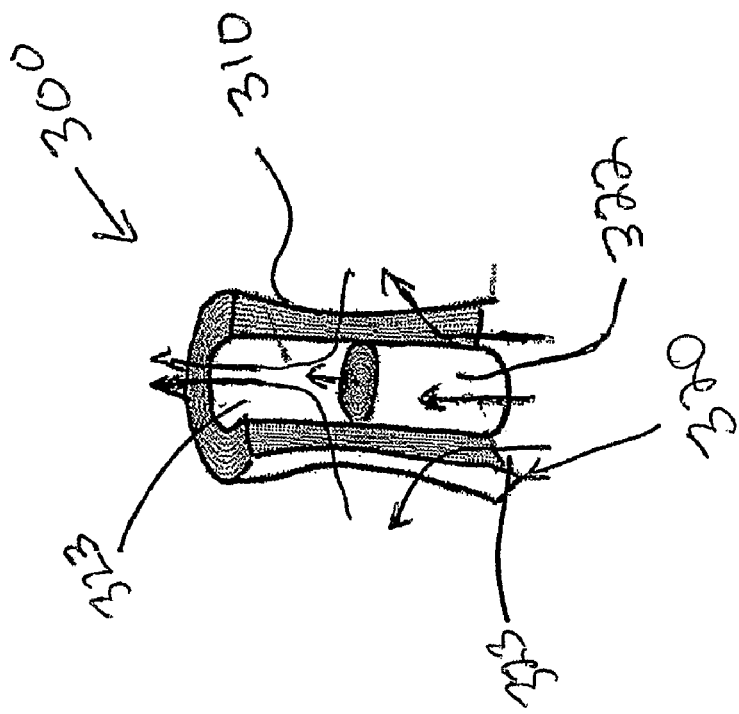
FIG. 12 is a perspective view of the rolled catalytic cylinder of FIG. 11.

In yet another exemplary application, the system 200 can be employed in crankcase emissions processing again without the use of a housing as shown in FIG. 9. A crankcase ventilation tube 280 is simply directed to a convenient location along the associated air intake system at a location between an air filer and a turbo charger (if so equipped) or a manifold, if not turbo equipped. The catalytic system 200 (rolled structure 220) is installed directly into an air intake tube and is connected to the crankcase ventilation tube at a location generally indicated at 282. This permits the crankcase emissions to be drawn out of the engine and directed into the air intake system and through the catalytic elements (layers 212, 214, 216), where the emissions is processed and immediately disposed into the intake air stream and combusted in the combustion chamber. The benefits of this embodiment are that a housing is not required which in turn ultimately saves weight, saves installation time and manufacturing cost just to name a few of the associated advantages.

As with the first embodiment, the catalytic system 200 according to this embodiment can be used in a wide variety of applications beyond the ones described above and more particularly, the catalytic system 200 is suitable for use in an environment where the processing of hydrocarbon emissions with minimal resistance to fluid flow is desired.

Turning now to FIGS. 10-14, a catalytic hydrocarbon processing system 300 according to a third embodiment is illustrated. The system 300 is similar to the systems 100 and 200 in that it contains a catalytic body 310 that is formed of a plurality of separate materials that are formed according to a predetermined shape. According to one embodiment, the catalytic body 310 is formed of three separate, different materials, namely, a first material 312, a second material 314, and a third material 316, that are layered with respect to one another.

Similar to the previous embodiments, the three materials 312, 314, 316 are metals and in one embodiment, the materials are the same as the materials of the prior embodiments. In other words, the first material 312 is stainless steel, the second material 314 is copper and the third material 316 is aluminum.

The three materials 312, 314, 316 are preferably in screen form and are cut into strips of even, predetermined widths and lengths, for the required application, and are overlapped evenly over one another. While, the illustrated embodiment shows the three materials 312, 314, 316 having the same width and the first material 312 having a longer length, it will be appreciated that the lengths of all three materials 312, 314, 316 can be the same. As described above with reference to the first embodiment, by cutting the layer of the first material 312 to a greater length, the final wrapping layer (outer winding) of the rolled structure is defined by the first material 312. However, the lengths of the three materials can be the same. In the illustrated embodiment, the second and third materials 314, 316 have lengths that are less than the length of the first material 312.

The three materials 312, 314, 316 are in screen form and are all formed of dissimilar metallic materials with relative similarities in terms of their thickness, density and openings per unit area. For example, the screens can have a thickness between about 0.010 to about 0.040 inch and the screens can have between about 10 and about 60 openings per square inch, e.g., 20 openings per square inch. One difference is that in this embodiment, the final wrapping of stainless steel mesh material is sufficiently strong to support the entire rolled assembly of reactive materials in their environment.

The three layered structure (catalytic body 310) has a first end 311, where all three materials 312, 314, 316 are present in a layered manner, and an opposing second end 313 where only the first material 312 is present. The layered catalytic body 310 is then cut in several locations, as described below, so as to form a built-in base structure 320 and a dense center core 322 at one end a formed hollow center cylindrically shaped rolled catalytic structure 330 that is determined by the multiple adjustable layers of catalytic materials 312, 314, 316. The center section (center core 322) is specifically designed to form a restrictive, but not solid, core of catalytic materials allowing the fluid contacting it to be diverted resulting in an effective improvement of a circulation of the fluid through the body 310 of reactive elements (materials 312, 314, 316), while still allowing fluids to pass through it. This effectively solves the problem of crankshaft emissions condensing into liquid as in other devices where the liquid contacted a solid restrictive plate utilized in a number of previous designs. In addition, the non-solid center core 322 effectively allows fluids to pass through it where necessary. For example, when drainage is required as a result of excessive fluid accumulation or when fluid fuels are required to pass through it for increased catalytic reactivity. This effectively allows multiple uses without internal modifications for each specific application.

The layered structure 310 is formed such that the three layered structure at the first end 311 has a uniform first width that extends a predetermined distance from the first end 311 to a point 315 where the width of the layered structure 310 increases to a second width that this greater than the first width. This results in a shoulder 317 being formed at the point 315 where the width of the structure 310 increases and in the illustrated embodiment, the shoulder 317 is a formed at a right angle to the section of the layered structure 310 that has the smaller first width. The precise relationship between the values of the first and second widths can be varied; however, in one embodiment, the second width can be about two times the value of the first width. In the illustrated embodiment, the layered structure 310 has a uniform second width from the point 315 to a point 319 where the second and third materials 314, 316 terminate and only the first material 312 is present from the point 319 to the second end 313. The layer of first material 312 that forms the outer wrapping (i.e., the length of first material 312 that extends from the point 319 to end 313) can have a varying width. In particular, this layer of first material 312 can have the second width from the point 319 to another point 321 where the width of the first material layer increases to a third width that is greater than the first and second widths. Preferably, the layer of first material has a uniform width (third width) from the point 321 to the second end 313.

In this region of the layer of first material 312 from the point 321 to the second end 313, a plurality of linear side cuts 324 are formed in the material along one side edge 321 thereof. The side cuts 324 are spaced apart from one another and are parallel to one another, with a length of each side cut 324 generally being the difference between the second and third widths to permit sections or tabs 326 formed between the cuts 324 to be folded over along a fold line that is generally co-linear with the edge 321.

The layered structure is then rolled beginning at the first end 311 and toward the second end 313. At the start of the rolling procedure, the tight center core 322 of the dissimilar metallic screens 312, 314, 316 is formed as the layered structure 310 is tightly rolled in this narrower region from the first end 311 to the point 319 (where the layered structure has the first width). The predetermined distance from the first end 311 to the point 319 ultimately determines the overall diameter of the dense core 322 that is formed as the layered structure 310 is rolled.

The layered structure 310 is further rolled in the direction of the second end 313 after it is rolled past the point 319. As the layered structure 310 is rolled from the point 319 to the second end 313, the rolled structure increases in its width due to the difference between the first width and the second width. As the layered structure 310 is rolled in this manner and the wider section of overlapping materials is encountered, a hollow cylinder 323 is formed in the center area parallel and in line with the dense core 322. The rolling procedure is continued until the desired predetermined number of layers or density is reached. Once the desired predetermined potential reactivity has been obtained, due to the structure having the predetermined number of layers or density, the final layer (outer final wrapping) is formed around the body of the reactive elements in such a way as to remain flush with the end of the cylinder of materials with the open center core and extending a predetermined distance below the other end of the roll of materials which has the dense inner core 322.

The base structure 320 is formed at one end of the catalytic structure 330 and serves to form a support structure to hold the body of the rolled structure 330 a predetermined distance from a housing end cap when the system 300 is assembled. The base structure 320 is formed by folding select tabs 326 along a fold line that is co-linear with edge 321 so as to form a plurality of legs that are circumferentially disposed about the cylindrical end of the rolled structure 330. It will be appreciated that each tab 326 that is folded along the fold line forms a notch or window 327 through which the entering fluid to be treated can flow radially outward from inside the rolled structure 330 to an exterior location. In one embodiment, every other tab 326 is folded to form one notch 327 and thus, define an alternating pattern of notches and legs. The unfolded tabs 326 that define the legs thus act as spacers since these tabs 326 serve to space the dense inner core 322 from the end of the housing.

This design and method of assembly eliminates the need for restrictive plates, a support tube or accessories, to hold or otherwise position the roll of catalytic materials a given distance from the end cap, thereby effectively allowing an unrestricted flow of hydrocarbon fluids into and out of the rolled structure 330 (catalytic device). Since this device is reversible, this embodiment permits the hydrocarbon fluids to expand in the hollow center section formed by the roll structure 330 (i.e., the center opening in the dense inner core 322) and in the hollow cylinder 323 formed at the other end of the structure 330 of reactive elements/materials or in the chamber that is formed by positioning the rolled structure 330 away from the housing end cap due to the tabs 326 of the base structure 320. The expansion of these fluids in both of these sections improves circulation and allows condensed fluids to easily pass through the device (rolled structure 330) without interfering with the ongoing chemical reactions between the reactive elements. In addition, the final layer (outer wrapping) of the first material 312 secures the roll of reactive elements (layers 312, 314, 316) in position without coming apart or otherwise becoming unraveled, thereby effectively allowing this catalytic component to be shipped or stored separately from the housing.

It will also be understood that it is possible to eliminate the procedure for notching and bending the layer of first material 312 to form the supporting member (base structure 320) for positioning the reactive elements away from the end cap by simply positioning two similar rolls of materials (e.g., rolled structure 330) in line with their dense inner cores contacting each other. When positioned into a housing in this alternative arrangement, the hollow center cylinders 323 are each in line with the end cap openings and as a result, fluid entering or exiting the device (rolled structure 330) is allowed to expand in the cylindrical openings (cavities 323). Once installed in a suitable housing, these designs allow nearly unlimited potential in their applications with having the ability to safely and effectively process most hydrocarbon fluids, emissions, or fuels. The flow of hydrocarbon fluids need only be connected to one end of the housing's end cap fitting (inlet 126 or outlet 128) and allowed to flow through the device, where the hydrocarbons may activate the electrochemical reactions with the arranged elements and become reorganized and converted. The hydrocarbon fluids then simply pass out of the other end cap fitting and continue flowing to the intended combustion equipment or desired end use. This embodiment, like the other embodiments, can be installed in any desirable position or preferable or convenient location along the fuel line or crankcase ventilation tube on the required application, such as an internal combustion engine, furnace, turbine, etc., or it can be installed in any other setting where it is desired to treat hydrocarbon fluids in the manner described herein.

Figure 13:
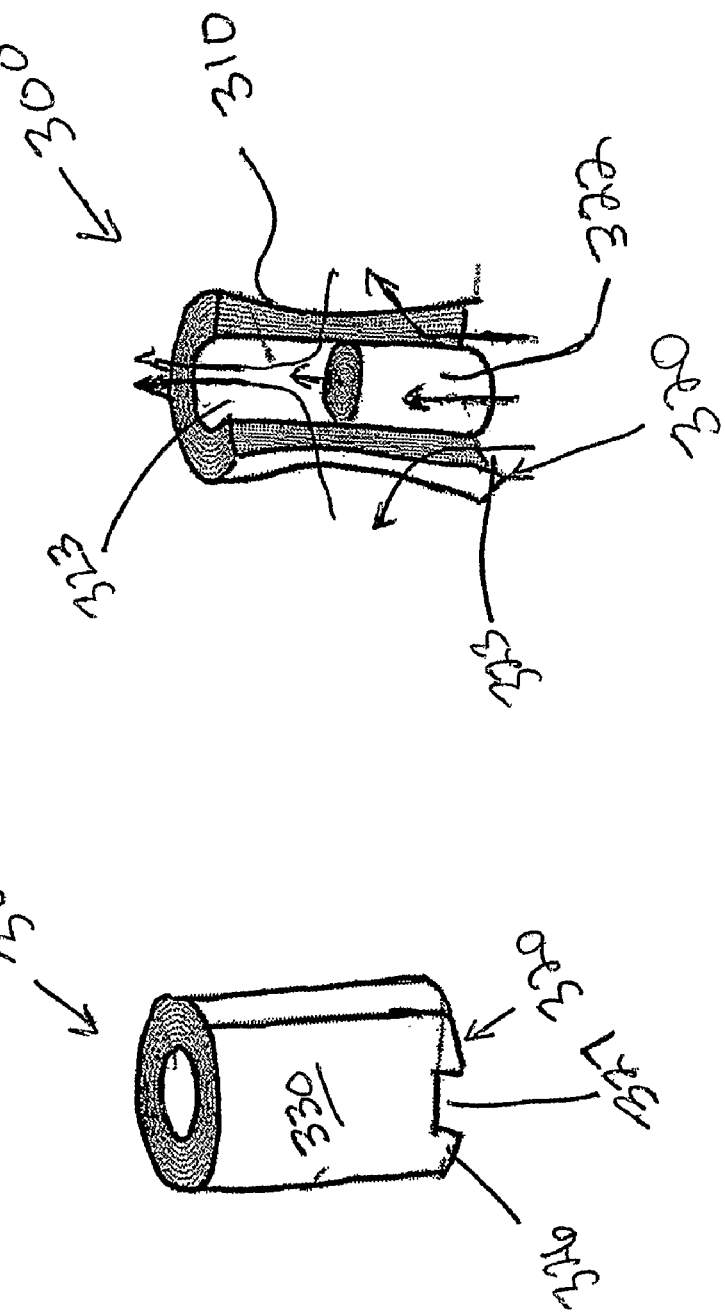
FIG. 13 is a cross-sectional view of the rolled catalytic cylinder taken along the line 13-13 of FIG. 12.
Figure 15:
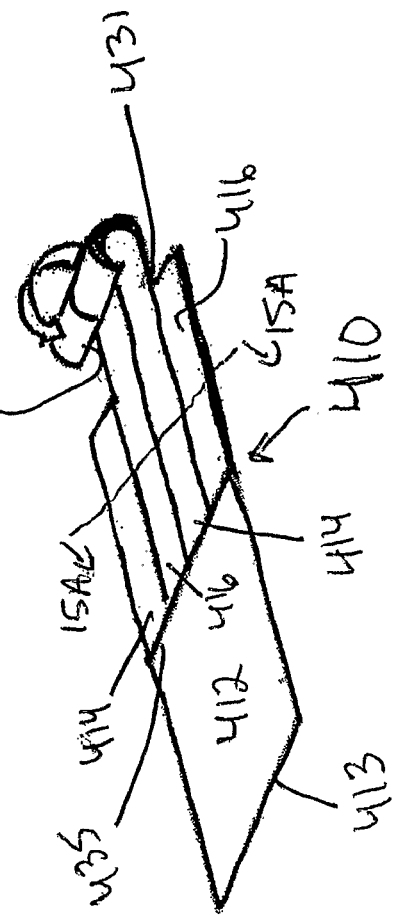
FIG. 15 is a perspective view of various layers of material that are used to form a catalytic hydrocarbon processing system according to a fourth embodiment.
Figure 15A:
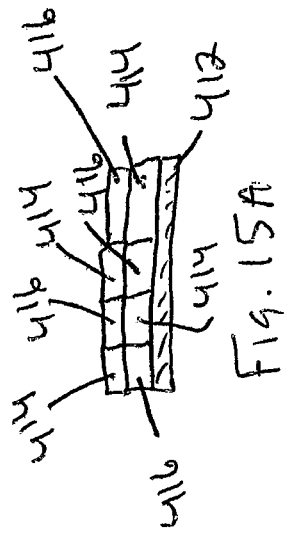
FIG. 15A is a cross-sectional view taken along the line 15A-15A of FIG. 15.
Figure 14:
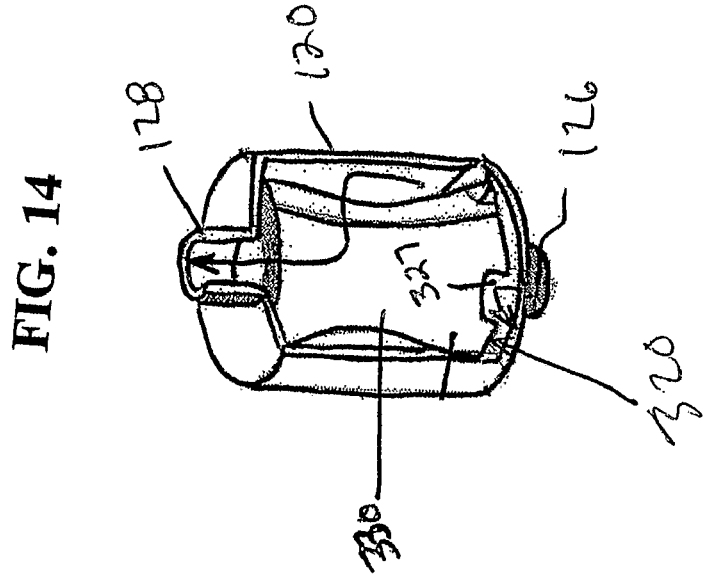
FIG. 14 is a perspective view, partially broken away, illustrating the rolled catalytic cylinder of FIG. 12 in a housing.

The flow paths of the hydrocarbon fluids are generally indicated by the arrows in FIGS. 13 and 14. In this embodiment, the hydrocarbon fluids enter the housing 120 through the inlet fitting 126 which in this case is shown as being at the bottom for mere convenience and for illustration purposes. As with the other embodiments, the fluid will flow according to a number of different paths, with a preference toward the paths of least resistance. In terms of this embodiment, the fluid flows into the base structure 320 toward the dense inner core 322. Some of the fluid continues its axial flow longitudinally and flows into the denser inner core 322; however, the density of this region makes this a flow path of greater resistance and therefore, the fluid typically will flow along flow paths of less resistance. For example, the fluid can radially flow out through the windows created by the notches 327 to the exterior space between the exterior (final wrapping) of the rolled structure 330 and the inside of the housing 120. In addition, fluid can flow through the mesh screens around these notches 327 to this exterior space. Fluid that travels in this manner is then passed back through the reactive materials (layers 312, 314, 316 of the rolled structure 330) so as to expose the hydrocarbon fluids to the reactive materials and permit the fluid to flow into the cylindrical opening 323 formed at the end of the rolled structure 330. The cylindrical opening 323 is arranged in proximity and in fluid communication with the outlet fitting of the housing 120 so that the fluid passes through the opening or compartment 323 in order to exit the housing 120. Since some type of pump or the like is operatively connected to the outlet fitting as by an outlet conduit or the like, the compartment 323 is an area of lower pressure within the housing 120 and as a result, the fluid flows toward this location as when the fluid lies in the exterior space between the rolled structure 330 and the housing 120.

Now turning to FIGS. 15-18, a catalytic hydrocarbon processing system 400 according to a fourth embodiment is illustrated. The system 400 is similar to the other previously described systems in that it contains a catalytic body 410 that is formed of a plurality of separate materials that are formed according to a predetermined shape and arranged in a predetermined manner. According to one embodiment, the catalytic body 410 is formed of three separate, different materials, namely, a first material 412, a second material 414, and a third material 416, that are layered with respect to one another.

Similar to the previous embodiments, the three materials 412, 414, 416 are metals, such as one of the transition metals or other metals described above, or an alloy or other metallic material. In one embodiment, the materials are the same as the materials of the prior embodiments. In other words and according to one exemplary embodiment, the first material 412 is stainless steel, the second material 414 is copper and the third material 416 is aluminum. However, it is clearly within the scope of the present invention that other materials can be used and in one alternate embodiment, only copper and aluminum materials are used; however and as mentioned herein, the present applicants have discovered that the catalytic properties of the systems 100, 200, 300, 400 are enhanced when three metals are used and in particular, when the three above metals are used.

The three materials 412, 414, 416 are preferably in screen from in their pure elemental densities, within practical limitations, or alternatively, a suitable material can be coated with the metal element and its oxide to produce the desire screen material. When the materials 414, 416 are copper and aluminum, these materials are widely available in their pure or nearly pure elemental densities in screen form and in several thicknesses and densities that are suitable for the present applications, as measured by the screen's wire diameter and the area opening. When the first material 412 is stainless steel, it is obviously a mixture of different metals and the grade or type is not critical so long as it is stainless steel and in screen form with similar density and thickness as the other two materials.

In this embodiment, the materials 412, 414, 416 are cut and positioned in such a way as to form multiple contact sites of alternating dissimilar metallic elements in the vertical and horizontal planes to the fluid flow (which can be a liquid or vapor fluid flow) when the layers are rolled into a cylindrically shaped layered structure 420. In the illustrated embodiment, the base layer is formed of the first material 412 (e.g., stainless steel), while the second and third materials 414, 416 are cut into strips of predetermined widths and lengths, for the required application, and are laid over the base layer of first material 412. While, the illustrated embodiment shows the three materials 412, 414, 416 having the same width and the first material 412 having a longer length, it will be appreciated that the lengths of all three materials 412, 414, 416 can be the same. As described above with reference to the first embodiment, by cutting the layer of the first material 412 to a greater length, the final wrapping layer (outer winding) of the rolled structure is defined by the first material 412. However, the lengths of the three materials can be the same. In the illustrated embodiment, the second and third materials 414, 416 have lengths that are less than the length of the first material 412.

The layered structure (catalytic body 410) has a first end 411, where all three materials 412, 414, 416 are present in a layered manner, and an opposing second end 413 where only the first material 412 is present. The layered catalytic body 410 includes a dense center core 430 that is formed generally in a central region of the rolled structure 420 between the ends 411, 413, with a pair of cylindrically shaped compartment or cavities 432 being formed at the ends 411, 413 on either side of the dense center core 330.

The layered structure is cut and configured so that the first end 411 has a first width that extends from the first end 411 to a point 431 where the width of the layered structure 430 increases to a second width greater than the first width. A shoulder 433 is thus formed at point 431 and delineates the regions of the structure having the first and second widths. In the illustrated embodiment, the structure 430 has the second width from the point 431 all the way to the second end 413, with the strips of the second and third materials 414, 416 terminating at a point 435 that is prior to the second end 413. This distance of the first material 412 from the point 435 to the second end 413 is sufficient to form the outer wrap or winding of the rolled structure 420. It will be appreciated that this type of arrangement causes the formation of the dense inner center core 430 in the middle or central inner region of the rolled structure 420, with the cylindrically shaped compartment or cavities 432 being formed at the ends 422, 424 on either side of the dense center core 430. The diameter and depth of the cylindrical compartments 432 and the center core 430 are variable depending on the particular intended application.

However, and regardless of the variability in these dimensions, the above method of assembly always produces consistent ratios of alternating dissimilar elements.

Figure 17:
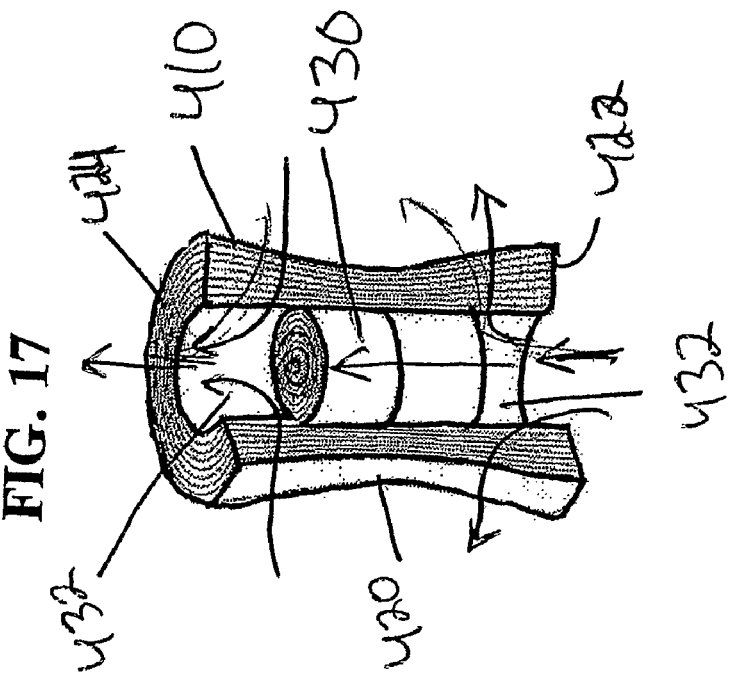
FIG. 17 is a perspective view, in cross-section, taken along the line 17-17 of FIG. 16 illustrating a dense inner core of the rolled cylinder.
Figure 16:
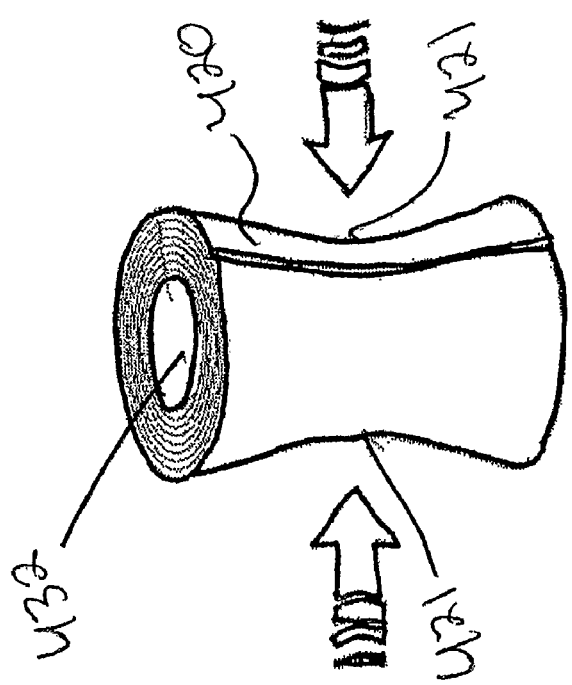
FIG. 16 is a perspective view of the layers of material of FIG. 15 rolled into a cylinder that serves as a catalytic device.
Figure 18:
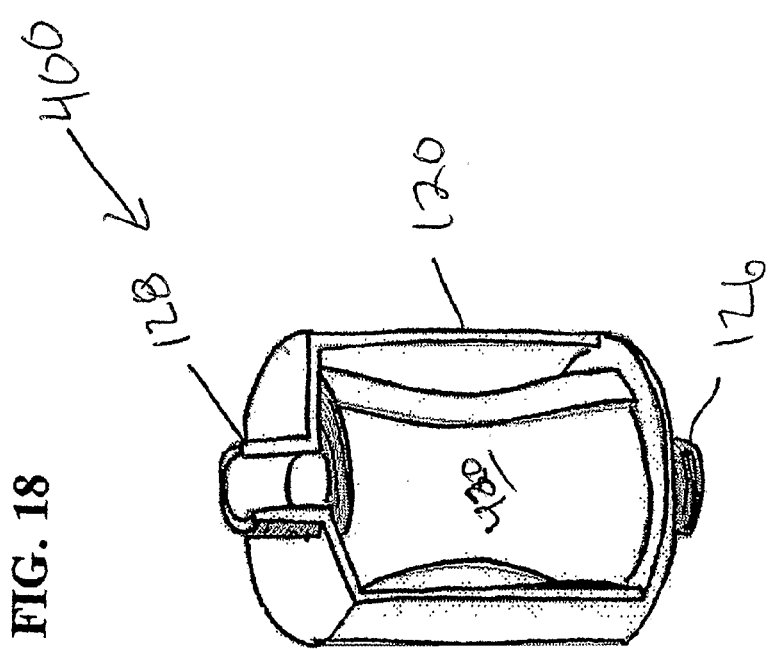
FIG. 18 is a perspective view, partially broken away, illustrating the rolled cylinder placed into a housing.

As the materials 412, 414, 416 are rolled together in this arrangement, the number of alternating dissimilar elements and potential catalytic reactivity increases until the desired predetermined diameter of the intended application is obtained. The final outer later in the form of only a screen of first material (e.g., stainless steel) and can be simply crimped around its outer circumference to the rolled structure 420 in position. If required to increase the density of the center core region 430, the entire roll of materials (rolled structure 420) can be slightly compressed (at location 421) along the circumference of the outer diameter in the center and perpendicular to the longitudinal axes. The compression at this point, as shown in FIG. 17, helps hold the materials tightly in their rolled configurations. In addition, it allows center core to become more restrictive for certain applications, such as fuel processing. The density of the center core 430 restricts the fluid flow, as in the prior embodiments, ultimately increasing fluid circulation in other regions of the cylinder 420 of reactive elements. In addition, in this configuration, the cylinder 420 of alternating dissimilar materials occurs in the horizontal and vertical planes to the fluids passing through these materials, thereby effectively increasing the potential reactivity. The rolled structure 420 of catalytic materials can be placed in the housing 120 as shown in FIG. 18, with the housing 120 having fittings 126, 128 and end caps to allow the hydrocarbon fluids to pass into and through the catalytic materials 412, 414, 416, where they are suitably processed and discharged out of the other end of the housing 120. This design is reversible and with threaded fittings on each end of the housing 120, it is adaptable to most fuel lines or crankcase emissions ventilation tubes on internal combustion engines.

The configuration in FIGS. 15-18 allows considerably more dissimilar metal reactive sites for applications requiring greater hydrocarbon processing and conversion reactions, such as required by certain liquid fuel burning equipment. This method of assembly is fast and requires no tooling change in the assembly plant, it does not restrict the flow of fluid excessively and takes up very little space for the extend of its increased reactivity. The open center (open cavities 432) on each end 411, 413 allows fluid to expand as it enters and exits the rolled structure 420. This helps make use of a greater surface area of materials with minimum space and more importantly, minimum resistance. Also, the strips of materials are arranged in a staggered, non-uniform order, to allow a greater reactivity, as a result of dissimilar materials in a linear plane as well as a perpendicular plane. In other words, the second and third materials 414, 416 are disposed in two layers that are parallel to one another and are disposed on the first layer 412, which is thus in a plane parallel to the other two layers prior to rolling or otherwise manipulating the layered structure into its desired shape. With each of these two planes, the strips 414, 416 alternate with respect to one another across the width of the first layer 412.

The present construction permits more chemical reactions with a minimum space and minimal restriction. The two outer ends 411, 413 of the cylinder 420 of catalytic materials are hollow and define the cavities 432, with predetermined diameters and the center region or section is dense core 430 effectively allowing the fluids to pass throughout the catalytic materials. This design requires no restrictive plates or retaining screens and can be made very consistently and rapidly.

The flow paths of the hydrocarbon fluids flowing through the system 400 (i.e., rolled structure 420 thereof) is essentially the same as the flow paths of the hydrocarbon fluids flowing through the system 100 and is generally indicated by the arrows in FIG. 17. As with the first system 100, the dense core 430 at least partially restricts the flow of the hydrocarbon fluids in that the fluid entering the cavity 432 closest to the inlet fitting flows radially outward through the reactive elements (screens 412, 414, 416) due to the presence of the dense core 430 within the flow path that extends longitudinally the length of the rolled structure 420.

In yet another embodiment, two of the metallic elements associated with me layered catalytic device are in screen form, e.g., aluminum and copper with approximately 20-30 openings per square inch and a thickness of approximately 0.020 of an inch, and a third metallic element is in the form of a stainless steel screen that is thin, non-perforated and cut to be narrower in width than the other two materials. The metallic materials are cut into predetermined length and width strips, for the chosen application, for example 2 inches wide for the aluminum and copper and 1 inch wide for the non-perforated stainless steel and with all having sufficient lengths to form approximately a 2 inch outside diameter cylinder when positioned evenly over one another and rolled together, for most automotive applications, fuel or crankcase emissions processing applications. The metallic materials are cut and positioned over one another evenly in any preferred order but with having the non-perforated stainless steel material centered evenly in such a way as to have equal margins of the other materials on either side. The metallic materials are cut and rolled together in such a way as to form a tight central core of predetermined depth, which may be variable for different applications. For example, a small engine's crankcase ventilation tube may require a dense central core of ½ inch in depth and a large diesel engine fuel line application may require a dense central core of approximately three inches in depth. As the central core is formed by rolling the pre cut narrow portion of layered materials together, the outer ends of the cylinder forms a hollow cylinder on each end of the dense central core when the wider portion of layered materials are reached. The hollow cylindrical ends are of predetermined diameter and depth for the chosen application, for example ⅜ of an inch in diameter and ½ of an inch in depth for most automotive applications and approximately 1 inch in diameter and 1 inch in depth for large diesel engine crankcase applications. When rolled together, the dissimilar metallic elements form a cylinder of evenly positioned alternating layers with hollow central ends and a dense core.

The non-perforated material in this embodiment, being narrower than the other screen materials, is positioned evenly and uniformly throughout the layers of dissimilar, alternating screens inside the cylinder. This allows the hydrocarbon fluids passing into the cylinder of metallic elements to be separated and divided as they pass through and parallel with the arranged cylinder of materials. This effectively provides a means of dividing the flow of hydrocarbon fluids. The input and output regions of the cylinder of dissimilar elements, parallel to the flow path of hydrocarbon fluids, do not restrict the lateral, or perpendicular flow of fluids, because they are perforated. This permits the entering or exiting hydrocarbon fluids to freely flow throughout the arranged elements with little restriction. However, the non-perforated material effectively eliminates any lateral passage of these fluids once they encounter this region. In this region the fluids are in contact with the three dissimilar metallic elements for a longer time interval allowing greater possibility for the molecules to become modified. After passing through the central core region containing the non-perforated element, the hydrocarbon fluids are allowed once again to pass laterally throughout the arranged metallic screen material and be allowed to enter the hollow portion extending from the central core region of the cylinder of arranged materials to exit the device through the end cap's fitting. This arrangement, of this embodiment, allows a greater division of the flow of hydrocarbon fluids resulting in a greater opportunity for molecular modification when in contact with the dissimilar metallic elements. Flow capacity is not appreciably reduced and there are no plates or other components necessary for producing a thorough distribution of fluids throughout the device. As well, this method of assembly provides an inexpensive and rapid manufacturing process while effectively providing consistency in material arrangement and densities during production and allows diversity in application requirements and arrangements with no re-tooling of manufacturing equipment.

For different applications, the materials are simply cut into wider and/or longer strips to satisfy nearly any desired application requirement, from small engines' fuel or crankcase ventilation tubes to very large industrial furnaces fuel lines. Once the cylinder of dissimilar materials has been formed, for the required application, it is placed in an appropriate container. This housing is preferably made of stainless steel tubing with end caps that can be sealed onto the housing body and threaded fittings at each end to allow fluids to pass into and out of the device. This allows the unit to be connected to an engine's crankcase ventilation tube or fuel line, liquid or vapor, in such a way as to have these fluids pass into one end of the housing's threaded end caps where the fluids are able to pass throughout the dissimilar metallic elements inside the device and allowed to escape out the other end cap fitting and into the desired end use, such as combustion chamber or intake air system, as required for each application. The housing chosen for containing the cylinder of dissimilar metallic elements is variable in length and diameter to conform to the roll of materials placed inside of it, which in turn is determined by the required application. For example a typical six cylinder automobile engine may require a device for fuel or crankcase ventilation emissions processing with dimensions that are approximately one and a half inches in diameter and two inches in length. A large diesel engine may require a device that is larger, for example with an outer diameter of approximately three inches and a length of approximately five inches. The cylinder of materials, once placed inside of the container, can be sealed in the housing by welding the end caps on, threading them on, or even pressing them in place, as long as the unit is leak resistant in its application, whether it be on a high pressure fuel line or a negative pressure crankcase ventilation tube. The end cap is preferably fitted with threaded fittings, for example an automotive application may require ¼ inch national pipe thread fittings and a large diesel engine may require 1 inch national pipe thread fittings. The threaded fittings allow appropriate adapters to be used in connecting the device to the required application, whether it is a fuel line or crankcase ventilation tube.

As with the other embodiments of this device, the installation is straightforward and logical. Fuel line installation requirements are simply that this device be connected to the fuel line of the desired equipment whether it is an engine, or furnace, or even a barbecue, in such a way as to have the fuel supply line connected to the device before it passes into the combustion apparatus. This may involve simply cutting the fuel supply line anywhere convenient and practical between the fuel supply tank and combustion apparatus. The fuel line is connected to the device in such a way as to have the fuel, vapor or liquid, enter the device and flow throughout the reactive elements and be allowed to exit the device and continue along its fuel line to the combustion application. The connection of the fuel line to the device can be made with the appropriate fittings and clamps to secure a leak proof environment. Distance from the combustion equipment and the device is not important, as the length of time or distance the freshly modified fuel must endure after being catalyzed has little effect on its newly altered reactivity. External heat and vibration have little effect on the function of this device as long as the installation location does not create a dangerous environment for the fuel passing through the device. This may include insufficiently safe distances from an excessively hot burner or manifold etc. These simple guide lines are no different than those outlined by a combustion equipment manufacturer's fuel line routing guide line in accordance to safety etc. It is important to note that this device requires no external heating, vibration, electrical stimulation or other procedures to aid in its function. It is bi-directional in its installation and it can be installed in any convenient position necessary for the required installation, vertical, inclined, or horizontal etc.

When installing the device on an engine's crankcase ventilation tube it is only necessary to have the vented emissions pass into and through the device where they are modified and allowed to pass out of the device and directed to the engine's fresh air intake system, after the air filter and before the turbo charger, if equipped. It is preferable, when convenient, to install the device in such a way as to have any condensed liquids drain back into the engine when the engine is not running. This is accomplished by simply installing the device in a location, such as slightly above the output connection of the vented crankcase emissions that will allow occasional drainage. The device is bi-directional and can be installed in any position convenient to the required application. There are no liquids or filtering mediums to clean or replace. There is no required maintenance and the service life of the device is expected to be several years, regardless of operational hours. The hoses transporting the crankcase emissions from the engine to the device and from the device to the air intake system are chosen to suite each given application. Large engines may require 1 inch inside diameter hoses and small engines may require only ⅜ diameter hoses. The hoses are connected to the device's input and output fittings simply with suitable clamps to provide leak proof connections. On many diesel engines that do not recycle crankcase emissions, a fitting may have to be installed in a convenient location between the engine's air filter and turbo charger, if equipped. This fitting allows the freshly modified crankcase emissions exiting the device to be drawn into the engine's combustion chamber. The size of the fitting and hoses are chosen to allow minimum restriction without being excessively large for the required application. The device does not produce excess heat during its operation and it is not affected by extremes in ambient temperatures, hot or cold.

In yet another embodiment, a catalytic device made in accordance with any of the above embodiments can be used in a two stroke muffler environment. More specifically, the catalytic device can be disposed along the emissions flow path prior to the emissions being delivered into the muffler itself for chemically modifying (decomposing) the hydrocarbons. One of the advantages of the catalytic devices of the present invention is that the catalytic devices do not generate heat since the reaction that occurs therein is not exothermic but instead is endothermic. This is desirable in a motorcycle environment, where a two stroke muffler would be used, since the body of the operator of the motorcycle is placed in close proximity to the muffler system and therefore, the inclusion of an exothermic catalytic device near the body (legs) of the operator would be undesirable and could lead to injury or at the very least discomfort due to the heat buildup.

The present applicants have also found that in the catalytic devices made in accordance with the above embodiments, the formation of the innermost layer (e.g., third layer 116) from aluminum yielded increased results and performance since this innermost layer is in general the last layer or surface that the fluid contacts prior to being discharged from the catalytic device. It will therefore be appreciated that instead of forming this innermost layer from aluminum, this innermost layer can be formed of a metal that is formed in the same group in the period table that contains aluminum. In particular, Gallium, Indium, and Thallium may be used in some applications as the innermost layer.

The following Examples illustrate some of the potential applications and advantages associated with the catalytic devices of the present invention and as embodied and described above. The following Examples are therefore merely exemplary and illustrative and do not serve to limit the scope of the present invention in any way.

EXAMPLE 1

A catalytic device made in accordance with the present invention was installed on a 1998 one ton delivery truck that is equipped with a 6.5 liter turbo diesel engine. The vehicle is equipped with a CDR valve (enclosed crankcase) and as is commonly known, CDR valves require routine replacement every 30,000 km because of sludge buildup on the valve.

The catalytic device was installed in July 2003 when the truck had a mileage of 70,000 km. The truck ran approximately 12 hours a day for 5 days a week as part of the continuous delivery operation and would travel about 300 km each day. In February 2005, after 20 months of operation in which the truck traveled 130,000 km, the catalytic device was removed for inspection and testing. The results of the visual inspection and testing were that the catalytic device has identical flow characteristics as when it was new prior to installation in the CDR valve. The catalytic device did not contain any buildup or suffer from flow restriction. No maintenance was performed and the catalytic device was not contaminated with sludge.

A new catalytic device was installed and the vehicle was test driven, with no apparent changes in sound or performance, indicating that the original device did not degrade in function after long term use.

The following benefits and advantages have been realized as a result of the incorporation of the catalytic device of the present invention in the vehicle: increased engine power, improved drivability (taster acceleration, less vibration), reduction in exhaust emissions, and quieter operation producing less drive fatigue.

EXAMPLE 2

A catalytic device made in accordance with the present invention was installed on a drag line in February 2005. The drag line is powered by an 8 cylinder Detroit Diesel 2 stroke 300 hp engine that was built in 1976. The engine has two open crankcase vents (road tubes) that emitted the carcinogenic gases directly below the operator's cab. The cab is not airtight and therefore, these toxic gases rise directly into the operator's cab resulting in the operator complaining of headaches, throat irritation, burning eyes and coughing.

The drag line also received a number of complaints from home owners in locations adjacent to where the drag line is being used to perform beach excursion in a tourist region. In particular, the diesel exhaust emissions were excessive and irritating. Fuel additives and the hiring of a diesel specialist to adjust the engine specifications and operations conditions failed to improve the situation.

The applicants installed a crankshaft catalytic device, enclosing the vent line, and installed a catalytic device along the fuel line, with each of the catalytic devices being one of the devices described hereinbefore. The use of the catalytic devices according to the present invention in these select locations resulted in remarkable improvements being observed. More specifically, the emissions problem no longer exists and both the neighbors and the operator no longer experience health problems. There is no longer a need to use expensive emission reduction fuel additives.

The following benefits and advantages have been realized as a result of the incorporation of the catalytic device of the present invention in both the crankcase vent line and fuel line: increased engine power (operator is able to move 25% more sand per day), quieter operation, less vibration and the engine oil stays cleaner for a longer period of time.

EXAMPLE 3

As part of the daily operations at a processing plant, diesel equipment is used indoors and the resulting emissions from this equipment caused major health concerns from the workers after several workers were hospitalized and there was a general feeling that the ventilation system indoors is inadequate.

In response to the problem, the company fitted three diesel engines that are used indoors with a catalyst system that includes one or more of the catalytic devices disclosed herein and installed in fuel lines and/or vent lines. As a result of this action, the diesel emissions problem has been entirely eliminated and the air quality test performed for the Workers Compensation Board after the installation of the catalytic systems of the present invention showed the diesel emissions to be only $1/7$ of the maximum allowable limits.

EXAMPLE 4

A catalytic device made in accordance with one of the embodiments of the present invention was installed as part of a crankcase emissions systems in a 4.3 liter V6 Chevrolet vehicle that had 110,000 km on it. After the vehicle had traveled 60,000 km with the catalytic device of the present invention installed in the crankcase equipment, the engine was examined and in particular, the carburetor was removed to observe the intake manifold which was remarkably clean. In addition, the rear main bearing showed no abnormal wear and the inside of the oil pan was amazingly clean, especially in view of the fact that the engine is a 10 year old engine. In sum, the internal working components and areas of the engine were remarkably clean as a result of the catalytic device of the present invention which served to process and chemically modify the hydrocarbons into segments that are cleaner and result in a much more efficient and cleaner operation of the engine, which results in improved emissions and engine performance.

EXAMPLE 5

In yet another application, a catalytic device made in accordance with one of the embodiments of the present invention was installed on a 3.5 hp lawn mower engine and more specifically, the catalytic device was installed as part of the crankcase vent line. Prior to the installation of the catalytic device of the present invention, the spark plug of the lawn mower was observed to have heavy residue and blackening due to 4 years of use without having been cleaned. After one hour of use with the catalytic device installed, a significant improvement was observed when the spark plug was taken out and observed. The spark plug was observed after two hours of operation and then several months later.

The results of the use of the present catalytic device were dramatic in that there was no carbon buildup on the valves of the spark plug and the overall cleanliness of the spark plug components substantially improved and there was a substantial decrease in the amount of residue that was on the spark plug.

The catalyst (catalytic devices) disclosed herein and made in accordance with the present invention can be characterized as being a selective catalyst. In order to describe why a selective catalyst is so useful and desirable, it is helpful to understand the intricacies of the combustion process. For example, it is known to add an additive to fuel in an attempt to chemically modify the fuel to create a cleaner burning fuel and in particular, it is standard practice for oil refiners to add tetraethyl lead as an additive for aviation fuels. The lead was simply a carrier for the very reactive ethyl radical. These reactive fragments initiated chain reactions in combustion allowing fire to commence easier, sooner, smoother and more controllably. All of these factors equal more power, lower operating temperatures, less vibration and lower emissions.

The selective catalyst according to the present invention produces similar reactive compounds and positive results as that achieved from aviation fuel additives and refining, but without the requirements of a lead carrier. This allows safety and diversity because it can be used not just for high performance aviation engines, but all engines and combustion equipment. The catalytic devices according to the present invention are distinctly different from other known catalysts because of the safe reactive intermediates that they produce. The catalytic device functions as an endothermic reactor and has an indefinite life span.

The catalytic devices made in accordance with any of the disclosed embodiments and in accordance with the teaching of the present invention offer a number of advantages including the following: improved ignitability of all hydrocarbon fluid fuel, easier starting, less explosive ignition characteristics, reduced ignition lag in diesel engines, slower flame propagation, lower ignition temperature, greater range of flammability limits, air-fuel ratios become less critical, excess oxygen not as detrimental to combustion equipment-flames are not as oxidizing, increased flame stability with all combustion equipment, detonation reduction, reduced ring fluctuations, vibration reduction by flame stabilizing, more controlled vibration energy of molecules in combustion chamber, increased energy loss of molecules in combustion chamber, sound of combustion reduced, power, torque and acceleration increase, compression pressure increase, lower opacity, carbon clusters in exhaust and combustion equipment, lower carbon monoxide, CO, levels in exhaust, lower hydrocarbon levels in exhaust, lower oxides of nitrogen emissions, No-x, in exhaust, lower levels of carbon dioxide, Co-2, reduced fuel, increased oil cleanliness-less carbon, fuel, water, acid contamination, reduced exhaust gas temperatures, reduced coolant temperatures, reduced lubricating oil temperatures, reduced automatic transmission temperatures, reduced valve and valve seat temperatures, to name just a few.

One of the advantages and differences between the present invention and previous catalytic devices and systems is that the present invention produced safe reactive intermediates during the catalytic process where the hydrocarbon containing fluid contacts the reactive sites of the present catalytic devices and is processed and treated such that the hydrocarbon molecular structures are chemically altered. The formation of the reactive intermediates using the catalytic devices of the present invention provides the following advantages: (1) increased chemical reactivity which (a) assists fuel decomposition; (b) assists vaporization of liquid fuels; and (c) assists decomposition of carbon clusters; (2) reduces required heat to promote chemical reactivity for combustion; (3) removes carbon which results in (a) reduced ring sticking; (b) reduced valve sticking (c) reduced valve seat contamination; (4) reduces carbon build up in manifolds; (5) reduces or eliminates sludge in intake from re-circulated emissions; and (6) cleans and eliminates the formation of carbon deposits on injectors, spark plugs, emissions control equipment, etc.

As previously mentioned, one particularly advantageous application for the catalytic devices of the present invention is in a crankcase ventilation enclosure. The following advantages are realized when the catalytic devices of the present invention are incorporated into a crankcase ventilation setting: eliminates open crankcase vent system on all internal combustion engines; allows vacuum in crankcase of engines without concern of oil contamination; produces ionic field allowing the removal of water and carbon sludge from crankcase; eliminates problems of combustion contamination associated with recycled crankcase emissions; elimination of open crankcase vent on large diesel engines eliminates outside contaminants from entering crankcase cavity of engine; vacuum in crankcase cavity helps rings to seal, more completely, the compression pressures from entering crankcase cavity; eliminates maintenance associated with crankcase emissions; vacuum in crankcase cavity reduces gasket leaks, vacuum in crankcase cavity reduces lubricating oil cavitations, and when lighter fractions of oil are vaporized and drawn out of the crankcase cavity of the engine, the lubricating oil maintains its viscosity.

However, it will be appreciated that the catalytic devices and systems can be used in a wide array of environments and applications beyond the ones disclosed herein. In general, the catalytic devices can be used in most, if not all, settings where hydrocarbon fluid are present and there is a need or desire to chemically alter and modify the hydrocarbons, on a molecular level, in order to improve operation efficiency and/or reducing emissions, etc. Such settings range from vehicles (trucks, heavy equipment, motorcycles) to enclosed structures where generators, boilers or other equipment are operated, and to small engine driven machinery, such as lawn mowers, etc.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

All references, publications, pending and issued patents are herein each incorporated by reference in their entirety.

What is claimed is:

1. A catalytic device for processing a fluid containing hydrocarbons comprising:
a reactive body formed of a plurality of materials arranged in a layered structure, the plurality of materials being formed of at least two different catalytic materials, the body having an inner core member and at least one inner cavity formed within the body, wherein the layered structure has regions of different densities and is permeable to the fluid along the length thereof to permit flow of the fluid through the layered structure, including through the inner core member.

2. The catalytic device of claim 1, wherein the plurality of materials comprises two or more different metallic materials.

3. The catalytic device of claim 2, wherein the metallic materials are selected from the group consisting of metals, metal alloys, and combination thereof.

4. The catalytic device of claim 1, wherein the plurality of materials comprises at least one transition metal.

5. The catalytic device of claim 1, wherein the plurality of materials comprises a first metallic material, a second metallic material, and a third metallic material, all of which are different from one another.

6. The catalytic device of claim 1, wherein the layered structure comprises a first metallic screen, a second metallic screen, and a third metallic screen, each screen being formed from a different metallic material.

7. The catalytic device of claim 6, wherein the second metallic screen is disposed between the first and third metallic screens, with a length of the first metallic screen being greater than lengths of the second and third metallic screens such that when the layered structure is rolled into a cylindrical body, an outer winding layer is defined by the first metallic screen.

8. The catalytic device of claim 6, wherein the inner core member includes the first, second and third metallic screens in rolled form.

9. The catalytic device of claim 1, wherein the body has a compressed region that is in the same region as the inner core member as measured along a longitudinal length of the layered structure.

10. The catalytic device of claim 1, wherein the at least one inner cavity comprises a hollow cavity that is formed and open at one end of the layered structure that is rolled into a predetermined shape and is disposed adjacent the inner core member.

11. The catalytic device of claim 1, wherein the at least one inner cavity comprises first and second inner cavities, with the first inner cavity being formed and open at one end of the layered structure which is rolled into a predetermined shape, the second inner cavity being formed and open at the other end of the rolled layered structure, wherein the inner core member is disposed between the first and second inner cavities such that a depth of the first and second inner cavities is defined at least in part by the inner core member.

12. The catalytic device of claim 1, wherein the inner core member extends, at least in part, from one end to the other end of the layered structure which is rolled into a predetermined shape with the at least one inner cavity comprising first and second annular cavities, with the first annular cavity being formed and open at one end of the rolled layered structure and defined between the inner core member and an outer circumferential section of the rolled layered structure, the second annular cavity being formed and open at the other end of the rolled layered structure and defined between the inner core member and the outer circumferential section of the rolled layered structure, the inner core member having a varying diameter along a length thereof resulting in each of the first and second annular cavities having a varying diameter.

13. The catalytic device of claim 1, wherein the inner core member comprises a compressed region of the layered structure rolled into a predetermined shape and the at least one inner cavity is open at an end of the rolled layered structure that is opposite an end where the compressed region is formed.

14. The catalytic device of claim 13, wherein the compressed region has a density that is greater than a density of the rolled layered structure along the remaining longitudinal length thereof.

15. The catalytic device of claim 13, wherein the compressed region closes off and defines one end of the inner cavity.

16. The catalytic device of claim 13, further including a conduit member that is disposed within the open ended inner cavity, with one end of the conduit member terminating proximate the compressed region.

17. The catalytic device of claim 1, wherein the layered structure comprises a first metallic screen, a second metallic screen, and a third metallic screen, each screen being formed from a different metallic material, wherein at least one first dimension of the first, second, and third metallic screens is the same and at least one second dimension is different.

18. The catalytic device of claim 17, wherein the at least one first dimension is a width of the screen, and the at least one second dimension is a length of the screen.

19. The catalytic device of claim 1, wherein the body has an integral base structure formed at one end thereof.

20. The catalytic device of claim 19, wherein the base structure comprises a plurality of spacer tabs formed by the layered structure which is rolled into a predetermined shape, the spacer tabs being disposed circumferentially about an outer periphery of the rolled layered structure.

21. The catalytic device of claim 20, wherein a plurality of the tabs are folded in a radially inward direction so as to define notches that are formed on each side of one spacer tab.

22. The catalytic device of claim 1, wherein the plurality of materials comprises a first metallic layer and second and third metallic layers that are disposed in alternating fashion across a face of the first metallic layer, each of the layers being formed of a different material.

23. The catalytic device of claim 22, wherein the first metallic layer has a surface area that is greater than a combined surface area of the second and third metallic layers, the first metallic layer being formed of a metal alloy, while the second and third metallic layers are formed of substantially pure metals.

24. A catalytic device for processing a fluid containing hydrocarbons comprising:
a reactive body formed of a plurality of metallic materials arranged in a layered structure, the plurality of metallic materials being formed of at least two different materials, the body having an inner core member having a first density and another region, formed along a longitudinal length of the rolled layered structure, that has a second density which is less than the first density.

25. The catalytic device of claim 24, wherein the layered structure is rolled into a predetermined shape.

26. The catalytic device of claim 25, wherein the layered structure, including the core member, is fluid permeable such that the hydrocarbon fluid is permitted to flow through the rolled layered structure along the length thereof resulting in the hydrocarbon fluid being placed in contact with reactive sites defined by the different metallic materials.

27. The catalytic device of claim 24, wherein the layered structure has an interior cavity formed in the other region that has the second density and is adjacent the inner core member.

28. The catalytic device of claim 24, wherein the inner core member is formed in a compressed region of the layered structure, which is rolled into a predetermined shape, resulting in the layered structure having the greater first density in the compressed region.

29. The catalytic device of claim 24, wherein the region that has the second density is a region that includes a hollow interior space formed within the rolled layered structure, the compressed region being formed at a location that defines an interface between the inner core member and the interior space.

30. A catalytic device for processing a fluid containing hydrocarbons comprising:
a catalytic body formed of at least three metallic materials arranged in a layered structure having a compressed region formed along a longitudinal length of the layered structure.

31. The catalytic device of claim 30, wherein layered structure is formed of overlapping screens that are rolled into a predetermined shape, the screens permitting flow of the fluid through interstices defined by the overlapping screens.

32. The catalytic device of claim 30, wherein the layered structure comprises a first metallic screen, a second metallic screen, and a third metallic screen, each screen being formed from a different metallic material.

33. The catalytic device of claim 32, wherein the second metallic screen is disposed between the first and third metallic screens, with a length of the first metallic screen being greater than lengths of the second and third metallic screens, such that when the layered structure is rolled into a cylindrical body, the outer winding layer is defined by the first metallic screen and the third metallic screen is formed of aluminum and defines a central opening formed in the cylindrical body such that the aluminum layer is the final layer the fluid contacts as it is discharged from the catalytic body through the central opening.

34. The catalytic device of claim 32, wherein the first, second and third screens are arranged such that in an initial position, they are disposed in substantially parallel planes with respect to one another, with the second metallic screen being disposed between the first and third metallic screens.

35. The catalytic device of claim 32, wherein the first, second and third screens are arranged such that in an initial position, they are disposed in substantially parallel planes with respect to one another, with the second and third metallic screens being disposed in an alternating manner across one face of the first metallic screen.

36. The catalytic device of claim 30, wherein the plurality of metallic materials is formed of at least two different materials, the body having an inner core member having a first density and a region that has a second density which is less than the first density, wherein the layered structure, including the core member, has a fluid permeable construction such that the hydrocarbon fluid is permitted to flow through the layered structure along the length thereof resulting in the hydrocarbon fluid being placed in contact with reactive sites defined by the different metallic materials, the layered structure being rolled into a predetermined shape.

37. The catalytic device of claim 30, wherein the compressed region is formed in a region where the inner core member has a maximum density.

38. The catalytic device of claim 30, wherein the layered structure is rolled into a predetermined shape and is compressed in a direction that is at least substantially perpendicular to an axis that extends along a longitudinal length of the rolled layered structure.

39. The catalytic device of claim 38, wherein the rolled layered structure has a cylindrical shape.

40. The catalytic device of claim 30, further including:
an intermediate flow restrictor formed along the longitudinal length and defined by a dense core of material between an interior inlet region and an interior outlet region, the flow restrictor serving to direct fluid flowing within the interior inlet region in a radially outward manner such that it flows through the permeable layered structure to an exterior location where it is drawn back through the permeable layered structure at a downstream location and into the interior outlet region.

41. A system for processing a fuel containing hydrocarbons comprising:
a source of fuel;
a fuel line that is in fluid communication with the source of fuel; and
a catalytic body disposed within the source of fuel and in fluid communication with the fuel line such that fuel is drawn into contact with the catalytic body as it is drawn into the fuel line for delivery to another location, the catalytic body being formed of a plurality of metallic materials arranged in a layered structure that is rolled into a predetermined shape and is permeable to fluid flow, the rolled layered structure having a compressed region formed along its longitudinal length.

42. The system of claim 41, wherein the fuel line is in fluid communication with an interior space formed within the catalytic body such that fluid is drawn through the rolled layered structure into the interior space where the fluid flows to one end of the interior space into the fuel line.

43. The system of claim 41, wherein the layered structure comprises a first metallic screen, a second metallic screen, and a third metallic screen, each screen being formed from a different metallic material.

44. The system of claim 41, wherein the plurality of metallic materials is formed of at least two different materials, the body having an inner core member having a first density and a region that has a second density which is less than the first density, wherein the layered structure, including the core member, has a fluid permeable construction such that the hydrocarbon fluid is permitted to flow through the layered structure along the length thereof resulting in the hydrocarbon fluid being placed in contact with reactive sites defined by the different metallic materials, the layered structure being rolled into a predetermined shape.

45. The system of claim 41, wherein the compressed region is formed in a region where the inner core member has a maximum density.

46. The system of claim 41, wherein the layered structure is rolled into a predetermined shape and is compressed in a direction that is at least substantially perpendicular to an axis that extends along a longitudinal length of the rolled layered structure.

47. A system for processing emissions containing hydrocarbons comprising:
a source of emissions; and
a catalytic body disposed within a flow path of the emissions such that the emissions are drawn into contact with the catalytic body as the emissions flow from one location to another location, the catalytic body being formed of at least three metallic materials arranged in a layered structure that is rolled into a predetermined shape that is permeable to fluid flow, the rolled layered structure having a compressed region formed along its longitudinal length, wherein the plurality of metallic materials are formed of at least two different materials, the body having an inner core member having a first density and a region that has a second density which is less than the first density, wherein the compressed region is formed in a region where the inner core member has a maximum density.

48. The system of claim 47, wherein the source of emissions comprises a component of crankshaft equipment associated with a combustion engine, with the flow path of the emissions flow traveling through a crankshaft ventilation tube in which the catalytic body is disposed.

49. The system of claim 47, wherein the inner core member is formed in a compressed region of the layered structure, which is rolled into a predetermined shape, resulting in the layered structure having the greater first density in the compressed region.

50. The system of claim 47, wherein the region that has the second density is a region that includes a hollow interior space formed within the rolled layered structure, the compressed region being formed at a location that defines an interface between the inner core member and the interior space.

51. A method for processing a fuel containing hydrocarbons and hydrocarbon containing emissions from a crankcase ventilation system comprising the steps of:
directing the fuel through a first catalytic device; and
directing the hydrocarbon containing emissions through a second catalytic device that is disposed in the crankcase ventilation system.

52. The method of claim 51, wherein each of the first and second catalytic devices is a layered screen structure formed of two or more metallic screen materials that are rolled into a predetermined shape.

53. The method of claim 52, wherein the step of directing the fuel through the catalytic device comprises the steps of:
directing the fuel into a first space formed in an interior of the rolled layered screen structure;
causing the fluid to flow radially outwardly through the layered screen structure to a location outside the first catalytic device; and
drawing the fluid from the location outside the first catalytic device in a radially inward direction through the layered screen structure and into a second space formed in an interior of the rolled layered structure through the which the fluid is discharged from the first catalytic device.

54. The method of claim 52, further including the step of:
forming a region of higher material density in the rolled layered structure compared to surrounding regions of the rolled layered structure.

55. The method of claim 54, wherein the step of forming the region of higher material density includes the step of:
compressing the rolled layered structure at a location along its longitudinal length.

56. The method of claim 55, wherein compressing the rolled structure forms a pair of lower density regions at ends of the rolled layered structure and the method further includes the steps:
introducing one of the fuel and hydrocarbon containing emissions into one of the lower density regions; and
discharging one of the fuel and the hydrocarbon containing emissions from the other of the lower density regions, with the higher density region causing one of the fuel and the hydrocarbon containing emissions disposed in the one lower density region to flow radially outward through the rolled layered structure and then be drawn back through the rolled layered structure and into the other lower density region, thereby causing the fuel or hydrocarbon containing emissions to flow across two reactive site regions.

57. The method of claim 54, wherein the step of forming the region of higher material density includes the step of:
forming an inner core member by making select cuts in the layered structure at an end where edges of the plurality of metallic materials are aligned and prior to the layered structure being rolled, the cuts defining an inner section that defines the inner core member with a pair of outer sections on either side of the inner section; and
folding the outer sections over to lie flush against the remaining layered structure prior to being rolled to form a rolled layered structure.

58. The method of claim 51, further including the steps of
forming a first inner space within the layered structure associated with the first catalytic device;
fluidly connecting a fuel line with the first inner space such that fuel that has been processed by contacting the layered screen structure is directed into the fuel line; and
positioning the second catalytic device within a ventilation tube associated with the crankcase ventilation system such that the hydrocarbon containing emissions flows across surfaces of the layered screen structure of the second catalytic device.

* * * * *